(12) United States Patent
Kimura et al.

(10) Patent No.: US 10,639,953 B2
(45) Date of Patent: May 5, 2020

(54) AUTOMATIC TILTING VEHICLE

(71) Applicant: TOYOTA JIDOSHA KABUSHIKI KAISHA, Toyota-shi, Aichi (JP)

(72) Inventors: Yukihide Kimura, Gotenba (JP); Toshihide Yano, Susono (JP); Junrou Yamamoto, Susono (JP); Taku Nagasawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 15/921,234

(22) Filed: Mar. 14, 2018

(65) Prior Publication Data

US 2018/0264905 A1    Sep. 20, 2018

(30) Foreign Application Priority Data

Mar. 17, 2017  (JP) ................. 2017-053346

(51) Int. Cl.
*B60G 17/016* (2006.01)
*B60G 21/08* (2006.01)
(Continued)

(52) U.S. Cl.
CPC ..... *B60G 17/0162* (2013.01); *B60G 17/0182* (2013.01); *B60G 17/0195* (2013.01);
(Continued)

(58) Field of Classification Search
CPC ........... B60G 17/0162; B60G 17/0182; B60G 17/0195; B60G 21/005; B60G 21/007; B60G 21/08; B60G 2600/20; B60G 2600/604; B60G 2400/0511; B60G 2400/0521; B60G 2400/0523; B60G 2400/102; B60G 2400/104; B60G 2400/106; B60G 2400/204;
(Continued)

(56) References Cited

U.S. PATENT DOCUMENTS 6,805,362 B1 * 10/2004 Melcher ................. B60G 7/006
                                                              280/5.52
7,460,936 B2 * 12/2008 Fulks ................. B60G 17/0162
                                                              60/600
(Continued)

FOREIGN PATENT DOCUMENTS

DE    102010039482 A1 *  5/2011  ............. B62K 5/027
JP       2012011995 A  *  1/2012
(Continued)

*Primary Examiner* — Laura Freedman
(74) *Attorney, Agent, or Firm* — Oliff PLC

(57) ABSTRACT

An automatic tilting vehicle is provided that includes left and right front wheels supported by knuckles, a steerable rear wheel, a vehicle tilting device, and a control unit. The vehicle tilting device includes a swing member, a tilt actuator for swing the swing member, and a pair of tie rods pivotally attached to the swing member and the knuckles. The control unit calculates a target lateral acceleration of the vehicle, estimates a lateral acceleration of the vehicle caused by the gyro moments of the wheels and calculates a target tilt angle of the vehicle based on a sum of the target lateral acceleration and the lateral acceleration caused by the gyro moments.

8 Claims, 13 Drawing Sheets

(51) Int. Cl.
| | |
|---|---|
| *B60G 21/00* | (2006.01) |
| *B60G 17/018* | (2006.01) |
| *B62D 9/02* | (2006.01) |
| *B62K 5/10* | (2013.01) |
| *B62K 5/08* | (2006.01) |
| *B62K 5/027* | (2013.01) |
| *B60G 17/0195* | (2006.01) |
| *B62K 5/05* | (2013.01) |
| *B62J 45/40* | (2020.01) |

(52) U.S. Cl.
CPC .......... *B60G 21/007* (2013.01); *B60G 21/08* (2013.01); *B62D 9/02* (2013.01); *B62K 5/027* (2013.01); *B62K 5/08* (2013.01); *B62K 5/10* (2013.01); *B60G 21/005* (2013.01); *B60G 2202/42* (2013.01); *B60G 2300/122* (2013.01); *B60G 2300/45* (2013.01); *B60G 2400/0511* (2013.01); *B60G 2400/0521* (2013.01); *B60G 2400/0523* (2013.01); *B60G 2400/102* (2013.01); *B60G 2400/104* (2013.01); *B60G 2400/106* (2013.01); *B60G 2400/204* (2013.01); *B60G 2400/208* (2013.01); *B60G 2400/302* (2013.01); *B60G 2400/34* (2013.01); *B60G 2400/39* (2013.01); *B60G 2400/40* (2013.01); *B60G 2400/41* (2013.01); *B60G 2401/28* (2013.01); *B60G 2401/904* (2013.01); *B60G 2600/20* (2013.01); *B60G 2600/604* (2013.01); *B60G 2800/012* (2013.01); *B60G 2800/70* (2013.01); *B62J 45/40* (2020.02); *B62K 5/05* (2013.01)

(58) Field of Classification Search
CPC ........ B60G 2400/208; B60G 2400/302; B60G 2400/34; B60G 2400/39; B60G 2400/40; B60G 2400/41; B60G 2300/122; B60G 2300/45; B60G 2401/28; B60G 2401/904; B60G 2800/012; B60G 2800/70; B60G 2202/42; B62K 5/027; B62K 5/05; B62K 5/08; B62K 5/10; B62J 2099/002; B62J 45/40; B62J 45/41; B62J 45/411; B62J 45/412; B62J 45/413; B62J 45/414; B62J 45/415; B62J 45/4151; B62J 45/4152; B62J 45/416; B62J 45/42; B62J 45/421; B62J 45/422; B62J 45/423; B62D 9/02
See application file for complete search history.

(56) References Cited

U.S. PATENT DOCUMENTS

| | | | | |
|---|---|---|---|---|
| 7,591,337 | B2* | 9/2009 | Suhre | B60G 3/20 180/210 |
| 7,647,999 | B2* | 1/2010 | Geiser | B60G 17/01908 180/210 |
| 7,802,800 | B2* | 9/2010 | Melcher | B60G 17/0162 180/282 |
| 8,020,878 | B2* | 9/2011 | Hara | B60G 13/08 280/124.103 |
| 8,123,240 | B2* | 2/2012 | Mercier | B62D 9/02 280/124.103 |
| 8,249,775 | B2* | 8/2012 | Van Den Brink | B62K 5/10 180/210 |
| 8,251,375 | B2* | 8/2012 | Hara | B62D 9/02 280/5.506 |
| 8,583,325 | B2* | 11/2013 | Carabelli | B62K 5/027 701/38 |
| 8,607,913 | B2* | 12/2013 | Daniels | B62D 7/148 180/210 |
| 8,781,684 | B2* | 7/2014 | Bruce | B60W 10/18 701/41 |
| 8,818,700 | B2* | 8/2014 | Moulene | G05D 1/0891 180/199 |
| 8,831,833 | B2* | 9/2014 | Hayashi | B60G 17/015 701/42 |
| 8,997,911 | B2* | 4/2015 | Hayashi | B60G 17/015 180/210 |
| 9,037,347 | B2* | 5/2015 | Hayashi | B60G 17/015 313/146 |
| 9,487,234 | B1* | 11/2016 | Matthies | B62D 9/02 |
| 9,555,849 | B1* | 1/2017 | Abbott | B62K 5/10 |
| 10,427,746 | B2* | 10/2019 | Yoshino | B62K 5/05 |
| 10,464,601 | B2* | 11/2019 | Yamamoto | B60G 21/007 |
| 10,513,291 | B2* | 12/2019 | Kato | B62K 5/10 |
| 2006/0180372 | A1* | 8/2006 | Mercier | B60T 8/1706 180/210 |
| 2013/0193656 | A1 | 8/2013 | Itoh et al. | |
| 2015/0274160 | A1* | 10/2015 | Lee | B62D 6/002 701/41 |
| 2018/0147908 | A1* | 5/2018 | Kameda | B60G 17/0182 |
| 2018/0222276 | A1* | 8/2018 | Kimura | B60G 17/0162 |
| 2018/0237065 | A1* | 8/2018 | Yamamoto | B60K 1/00 |
| 2018/0265156 | A1* | 9/2018 | Hara | B62D 5/046 |
| 2018/0334001 | A1* | 11/2018 | Kato | B60G 3/20 |

FOREIGN PATENT DOCUMENTS

| | | |
|---|---|---|
| JP | 2015-056989 A | 3/2015 |
| WO | 2012/049724 A1 | 4/2012 |

* cited by examiner

AUTOMATIC TILTING VEHICLE

CROSS-REFERENCE TO RELATED APPLICATION

The disclosure of Japanese Patent Application NO. JP2017-53346 filed on Mar. 17, 2017 is incorporated by reference in its entirety.

BACKGROUND

1. Technical Field

The present disclosure relates to an automatic tilting vehicle that automatically tilts (self inclines) to the inside of a turn when turning.

2. Description of the Related Art

An automatic tilting vehicle has a vehicle tilting device, and the vehicle is automatically tilted to the inner side of a turn by the vehicle tilting device at the time of turning. For example, International Publication No. 2012/049724 describes an automatic tilting vehicle that includes a pair of front wheels spaced laterally, a swing type vehicle tilting device, and a control unit that controls the vehicle tilting device, and the pair of front wheels are rotatably supported by corresponding knuckles. The vehicle tilting device includes a swing member swingable about a swing axis extending in a longitudinal direction of the vehicle, an actuator that swings the swing member about the swing axis, and a pair of tie rods. The pair of tie rods are integrally connected at the lower ends to the corresponding knuckles and pivotally connected at the upper ends to outer ends of the swing member on both lateral sides of the swing axis. Each tie rod includes a shock absorber and a suspension spring.

When the swing member swings about the swing axis, the pair of tie rods vertically move in opposite directions to each other, so that the front wheels move up and down in opposite directions relative to a vehicle body, thereby the vehicle inclines in a lateral direction. The control unit calculates a target tilt angle of the vehicle for stably turning the vehicle based on a steering operation amount of a driver and a vehicle speed and controls a swing angle of the swing member by the actuator to tilt the vehicle so that a tilt angle of the vehicle conforms to the target tilt angle. A target tilt angle of the vehicle is calculated so that a resultant force of the estimated centrifugal force and the gravity acts in a predetermined direction. For example, a target lateral acceleration of the vehicle is calculated based on a steering operation amount of a driver and a vehicle speed, instead of detecting an actual lateral acceleration of the vehicle so that the control of the tilt angle of the vehicle is not delayed, and a target tilt angle of the vehicle is calculated based on a ratio of the gravitational acceleration and the target lateral acceleration of the vehicle.

In a conventional automatic tilting vehicle as described in the above International Publication, when the swinging member is swung so as to move the pair of tie rods vertically in opposite directions to each other, a shock absorber and a suspension spring in each tie rod expands/contracts. Therefore, it is difficult to precisely control a tilt angle of the vehicle with good response so that the tilt angle of the vehicle conforms to a target tilt angle. Furthermore, each tie rod is integrally connected to a corresponding knuckle at the lower end, it cannot pivot relative to the knuckle. Therefore, a range of the vertical movement of each tie rod is limited to a narrow range and, accordingly, an angular range capable of tilting the vehicle is limited.

In order to alleviate the above restrictions of the conventional automatic tilting vehicle, a configuration has already been known in which each tie rod is pivotally connected at the lower end to a corresponding knuckle and is pivotally connected at the upper end to the outer end of the swing member, and a shock absorber and a suspension spring are disposed between the actuator and the vehicle body. In the automatic tilting vehicle of this configuration (hereinafter referred to as "improved automatic tilting vehicle"), left and right front wheels are suspended from a vehicle body by front wheel suspensions so that they can relatively displace with respect to the vehicle body in the vertical direction of the vehicle, but a relative inclination and a relative displacement in the lateral direction with respect to the vehicle body are limited.

According to an improved automatic tilting vehicle, since the tie rods that include no shock absorber and no suspension spring can transmit the displacement of the swing member to the knuckles efficiently and without delay, it is possible to accurately control the tilt angle of the vehicle to a target tilt angle with good responsiveness. Further, since each tie rod can pivot relative to both of the swing member and the knuckle, the turning performance of the vehicle can be improved by enlarging a range in which the tie rods can move vertically and enlarging an angular range in which the vehicle can tilt.

SUMMARY

In an automatic tilting vehicle, particularly an improved automatic tilting vehicle having a large tiltable angular range, as described below, there is a problem that an energy consumed by the actuator is large and a tilt angle of the vehicle cannot necessarily be precisely controlled to the target tilt angle. The inventors of the present invention have found as a result of intensive investigations on this subject that the reason is that gyro moments which attempts to return positions of the wheels to the positions in the standard state as in the straight running of the vehicle act on the wheels when turning the vehicle.

When the improved automatic tilting vehicle is tilted to the inside of a turn when turning, the left and right front wheels are inclined together with the vehicle body in a state of being rotated. A gyro moment acts to return the position of each of the left and right front wheels to the position in a standard state as in a straight running of the vehicle and a force caused by each gyro moment acts through the tie rod, the swing member, and the actuator, and is transmitted to the vehicle body via the front wheel suspension. Therefore, the vehicle body receives a force toward the outside of a turn, and the force acts to reduce a tilt angle of the vehicle. Therefore, the actuator must not only swing the swing member so that a tilt angle of the vehicle becomes a target tilt angle, but also must generate a force for maintaining the tilt angle of the vehicle at the target tilt angle against the above-mentioned action by the gyro moments. Accordingly, it is inevitable that an energy consumed by the actuator increases as compared to where no gyro moment acts on the left and right front wheels.

Further, when the actuator generates a force for maintaining a tilt angle of the vehicle at the target tilt angle against the above action by the gyro moments, a reaction force is transmitted to the vehicle body or the like. Consequently, as will be described in detail later, a relationship between the positional relationship between the swing member and the pair of tie rods becomes different from that in the standard state of the vehicle, and the actuator is displaced downward with respect to the wheels, resulting in that a height of the vehicle body becomes lower than the original height. When the height of the vehicle body is lowered, a center of gravity of the vehicle is displaced downward along the inclination direction of the vehicle, and a turning radius of the center of gravity increases in comparison with that in the standard state of the vehicle, so that an actual lateral acceleration of the vehicle decreases. Therefore, since a deviation between a target lateral acceleration and the actual lateral acceleration of the vehicle becomes large, even if the vehicle tilting device is controlled so that the tilt angle of the vehicle becomes a target tilt angle, it is difficult to accurately control the tilt angle of the vehicle to the target tilt angle.

Further, when the positional relationship between the swing member and the pair of tie rods changes, elastic deformation amounts of elastic members elastically urging the swing member and the pair of tie rods to their positions in the standard state of the vehicle change from the original values that are elastic deformation amounts when the positional relationship does not change, which causes to accumulate energy. The elastic members in this case are, for example, rubber bushes incorporated in the pivotal attachment portions.

In particular, when the vehicle is decelerated at a very high deceleration while the vehicle is turning, gyro moments abruptly decrease and forces transmitted to the swing member via the tie rods decrease sharply. Therefore, the elastic energy accumulated in each elastic member is released, the vehicle body is suddenly displaced upward with respect to the actuator along the inclination direction of the vehicle, and the center of gravity of the vehicle rapidly rises. Since the elastic deformation amounts of each elastic member and a suspension spring increase and decrease oscillatingly, a height of the center of gravity of the vehicle vibrates and an actual lateral acceleration of the vehicle also vibrates. Therefore, even if the vehicle tilting device is controlled so that the tilt angle of the vehicle becomes a target tilt angle, it is difficult to accurately control the tilt angle of the vehicle to the target tilt angle.

The present disclosure provides an automatic tilting vehicle improved to reduce an energy consumption by an actuator as compared with the prior art by calculating a target tilt angle of the vehicle in consideration of a lateral acceleration of the vehicle caused by the gyro moments acting on the wheels.

According to the present invention, an automatic tilting vehicle is provided which includes a pair of laterally spaced front wheels, at least one steerable rear wheel, a vehicle tilting device, and a control unit; the pair of front wheels are rotatably supported by corresponding knuckles; the vehicle tilting device includes a swing member swinging about a swing axis extending in the longitudinal direction of the vehicle, a tilt actuator for swinging the swing member about the swing axis, and a pair of tie rods that are pivotally attached to the swing member at upper end pivotal attachment portions on both lateral sides of the swing axis and pivotally attached to corresponding knuckles at lower end pivotal attachment portions; the tilt actuator is connected to a vehicle body via a suspension spring; the control unit is configured to calculate a target tilt angle of the vehicle for tilting the vehicle to the inner side of a turn and to control the tilt actuator so that a tilt angle of the vehicle conforms to the target tilt angle.

The control unit is configured to calculate a target lateral acceleration of the vehicle based on an amount of steering operation of a driver and a vehicle speed, to calculate gyro moments at least of the pair of front wheels based on wheel speeds and a yaw rate of the vehicle, to estimate a lateral acceleration of the vehicle caused by the gyro moments, and to calculate a target tilt angle of the vehicle based on a sum of the target lateral acceleration and the lateral acceleration caused by the gyro moments.

As will be described in detail later, when the automatic tilting vehicle turns, lateral forces due to the gyro moments act on the center of gravity of the vehicle in addition to a centrifugal force caused by the turning, so that a lateral acceleration caused by gyro moments is generated in the vehicle. However, in the conventional automatic tilting vehicle, a target lateral acceleration of the vehicle is calculated based on the steering operation amount of a driver and a vehicle speed, and a target tilt angle of the vehicle is calculated based on a ratio of the target lateral acceleration of the vehicle to the gravitational acceleration. The reason why an energy consumed by the actuator is large and it is difficult to accurately control the tilt angle of the vehicle to the target tilt angle is the fact that a lateral acceleration of the vehicle caused by the gyro moments are not taken into account when calculating a target tilt angle of the vehicle.

According to the above configuration, gyro moments at least of the pair of front wheels are calculated based on wheel speeds and a yaw rate of the vehicle, a lateral acceleration of the vehicle caused by the gyro moments is estimated, and a target tilt angle of the vehicle is calculated based on a sum of the target lateral acceleration and the lateral acceleration caused by the gyro moments. The target lateral acceleration of the vehicle corresponds to a centrifugal force caused by turning and a lateral acceleration due to the gyro moments corresponds to lateral forces due to the gyro moments. Therefore, it is possible to calculate a target tilt angle of the vehicle to a value more favorable than the prior art so that a resultant force of a sum of t a centrifugal force resulting from turning and a lateral force resulting from the gyro moments and the gravity act in a predetermined direction.

Therefore, the tilt actuator only needs to swing the swing member so that a tilt angle of the vehicle becomes the target tilt angle, and does not need to generate a force to maintain the tilt angle of the vehicle at the target tilt angle against the lateral force due to the gyro moment. Accordingly, an energy consumed by the tilt actuator can be reduced as compared with the prior art.

Furthermore, since the tilt actuator does not need to generate a force against a lateral force caused by the gyro moments, no reaction force is transmitted to the vehicle body or the like. Consequently, it is possible to reduce a degree to which a positional relationship between the swing member and the pair of tie rods is different from that in the standard state of the vehicle, and to reduce an amount of elastic energy accumulated by the elastic members. Therefore, the tilt angle of the vehicle can be controlled to the target tilt angle with higher precision than in the prior art, and the tilt angle of the vehicle can be controlled to a preferable value as compared with the prior art. That is, the controllability of the tilt angle of the vehicle can be improved.

In one aspect of the present invention, the control unit is configured to calculate the gyro moment based on at least wheel speeds of the pair of front wheels, a yaw rate of the vehicle, and a tilt angle of the vehicle.

As will be described in detail later, gyro moments acting on the wheels are influenced by a tilt angle of the vehicle. According to the above aspect, the gyro moments are calculated on at least one pair of front wheels based on a wheel speed, a yaw rate of the vehicle, and a tilt angle of the vehicle. Therefore, gyro moments can accurately be calculated for at least one pair of front wheels as compared to where the gyro moments are calculated without considering the tilt angle of the vehicle.

In another aspect of the present invention, the vehicle has a setting device that is operated by an occupant to set whether to limit a target tilt angle of the vehicle to a predetermined allowable maximum tilt angle or less and the control unit is configured to limit the target tilt angle to the allowable maximum tilt angle when a magnitude of the target tilt angle exceeds the allowable maximum tile angle in a situation where the setting device limits the magnitude of the target tilt angle.

According to the above aspect, in a situation where the setting device limits the magnitude of the target tilt angle, when a magnitude of the target tilt angle exceeds the allowable maximum tile angle, the target tilt angle is limited to the allowable maximum tilt angle. Therefore, in a situation where an occupant wishes to limit the magnitude of the target tilt angle of the vehicle to be equal to or less than the preset allowable maximum tilt angle, a magnitude of the target tilt angle of the vehicle can be prevented from exceeding the allowable maximum tilt angle.

In another aspect of the present invention, the control unit is configured to perform low pass filter processing on any one of the wheel speeds, the gyro moments, and the lateral acceleration of the vehicle caused by the gyro moments in a situation where the setting device sets to limit the magnitude of the target tilt angle.

According to the above aspect, in a situation where the setting device sets to limit the magnitude of the target tilt angle, low pass filter processing is performed on any one of the wheel speeds, the gyro moments, and the lateral acceleration of the vehicle caused by the gyro moments. Therefore, it is possible to prevent the gyro moments and the lateral acceleration of the vehicle from suddenly changing due to a sudden change in a wheel speed, thereby preventing a sudden change in the target tilt angle of the vehicle so that a sudden change in a tilt angle of the vehicle can positively be prevented to improve the ride comfort of the vehicle.

In another aspect of the present invention, the control unit is configured to perform low pass filter processing on any one of the wheel speeds, the gyro moments, and the lateral acceleration of the vehicle caused by the gyro moments even in a situation where the setting device does not set to limit the magnitude of the target tilt angle, and a cutoff frequency of the low-pass filter process in a situation where the setting device sets to limit the magnitude of the target tilt angle is set to a value lower than a cutoff frequency of the low pass filter process in a situation where the setting device does not set to limit the magnitude of the target tilt angle.

According to the above aspect, in a situation where the setting device sets to limit the magnitude of the target tilt angle, low pass filter processing can be performed on any one of the wheel speeds, the gyro moments, and the lateral acceleration of the vehicle caused by the gyro moments. Therefore, a sudden change in the tilt angle of the vehicle can be prevented so that the ride comfort of the vehicle can be improved. On the other hand, in a situation where the setting device does not set to limit the magnitude of the target tilt angle, it is possible to reduce the effect of the low pass filter processing and quickly change the target tilt angle so that the target tilt angle does not lag and becomes a value suitable for the running condition of the vehicle. Therefore, for example, even when a vehicle speed and/or a steering operation amount of the driver rapidly changes, a tilt angle of the vehicle can be controlled so that it becomes an angle suitable for the running condition of the vehicle, which enables to secure good turning performance.

Other objects, other features and attendant advantages of the present invention will be readily understood from the description of the embodiments of the present invention described with reference to the following drawings.

DETAILED DESCRIPTION

Some embodiments of the present disclosure will now be described in detail with reference to the accompanying drawings.

First Embodiment

In FIGS. 1 to 4, an automatic tilting vehicle 10 according to an embodiment of the present disclosure is a tricycle vehicle with a capacity of one which includes a pair of front wheels 12L and 12R that are non-steered drive wheels, and a rear wheel 14 that is a steered driven wheel. The front wheels 12L and 12R are spaced apart from each other in the lateral direction and are rotatably supported about a rotation axis (not shown) by corresponding knuckles (wheel carriers) 16L and 16R.

Figure 1:
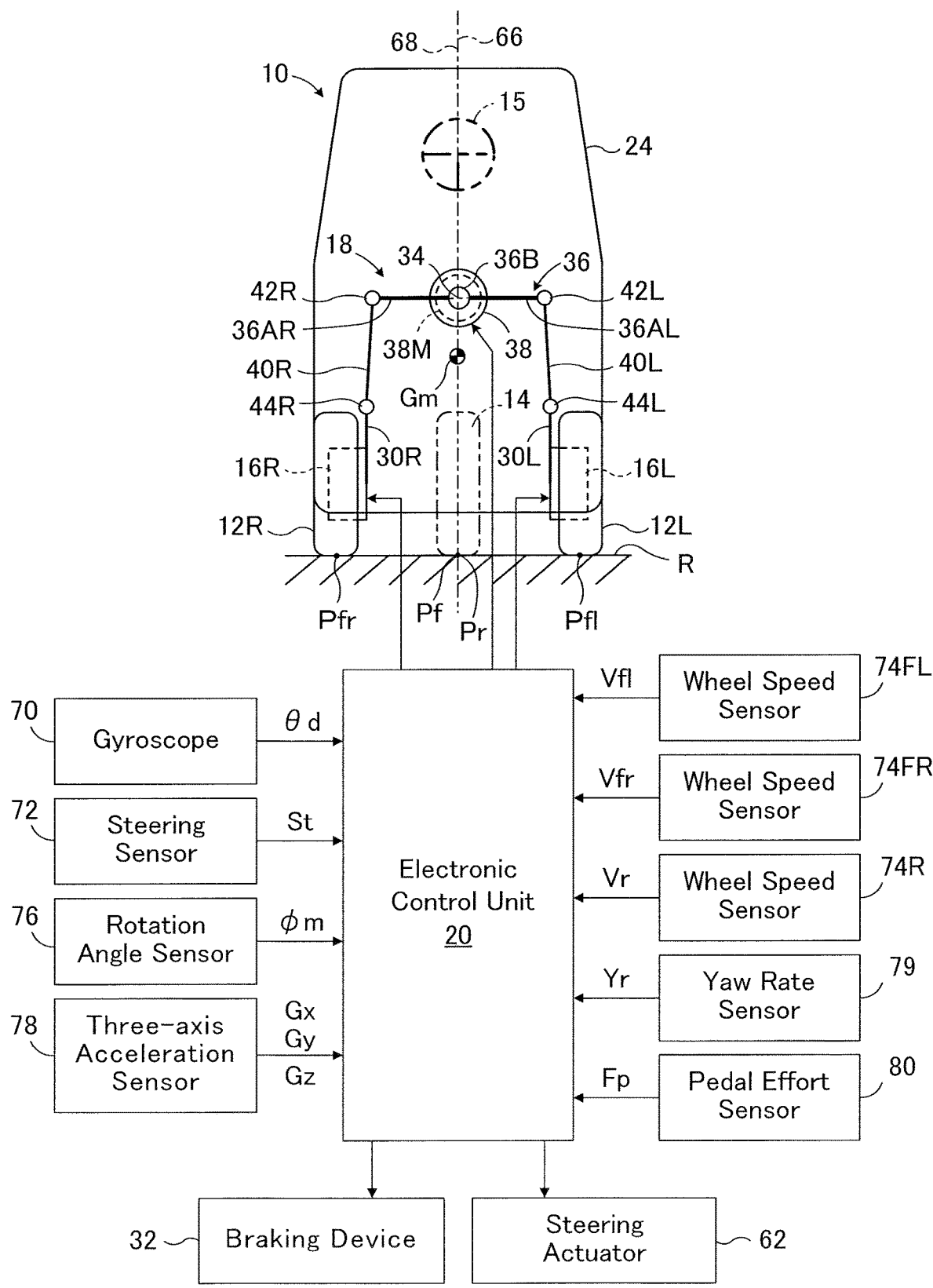
FIG. 1 is a schematic front vertical cross-sectional view showing a first embodiment of an automatic tilting vehicle according to the present disclosure.
Figure 6:
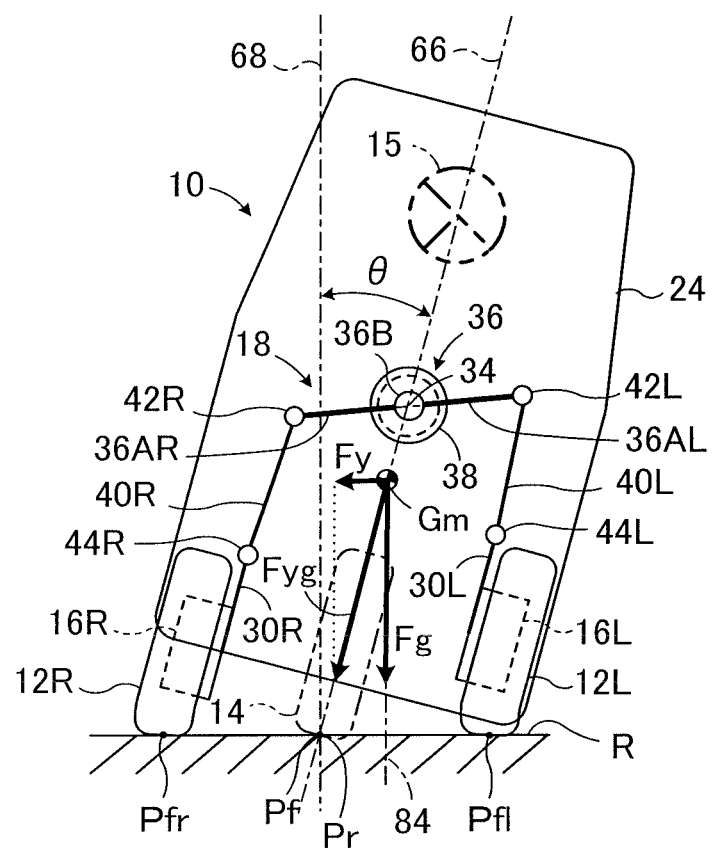
FIG. 6 is a front vertical cross-sectional view showing the embodiment in a state of left turning cut along the lateral vertical cutting plane at the front wheel position.

In the embodiment, a camber of the front wheels 12L and 12R is a neutral camber, so that a camber angle of the front wheels at the time when the vehicle 10 is not turning. It should be noted that the camber of the front wheels may be a negative camber or may be a positive camber. The rear wheel 14 is located rearward of the front wheels and steered in a steer-by-wire manner according to an amount of operation of a steering wheel 15 by a driver, as will be described in detail later. In FIG. 1 and FIG. 6 described below, the steering wheel 15 is shown at a position different from an actual position. The automatic tilting vehicle 10 further includes a vehicle tilting device 18 and an electronic control unit 20.

In the illustrated embodiment, the knuckles 16L and 16R each incorporate an in-wheel motor as a driving device, which is not shown in the figure. The knuckles 16L and 16R are supported by corresponding suspension arms 22L and 22R so as to be vertically displaceable with respect to a vehicle body 24 and to restrict lateral displacement and inclination with respect to the vehicle body 24.

The illustrated suspension arms 22L and 22R are leading arms that are integrally connected to the knuckles 16L and 16R at their front ends, respectively, and are connected at their rear ends to the vehicle body 24 by joints 28L and 28R, respectively. The joints 28L and 28R may be joints such as rubber bushing devices having axes extending substantially in the lateral direction. As long as the above requirements relating to the knuckles 16L and 16R are satisfied, the suspension arms 22L and 22R may be other arms such as a trailing arm or a combination of upper and lower arms.

The lower ends of the knuckle arms 30L and 30R are integrally connected to the vicinities of the front ends of the suspension arms 22L and 22R, respectively. The knuckle arms 30L and 30R extend substantially in the upward direction from the suspension arms 22L and 22R so as to extend in the vertical direction with respect to the knuckles 16L and 16R and move up and down integrally with the front end portion of the corresponding suspension arms and the knuckles.

Figure 3:
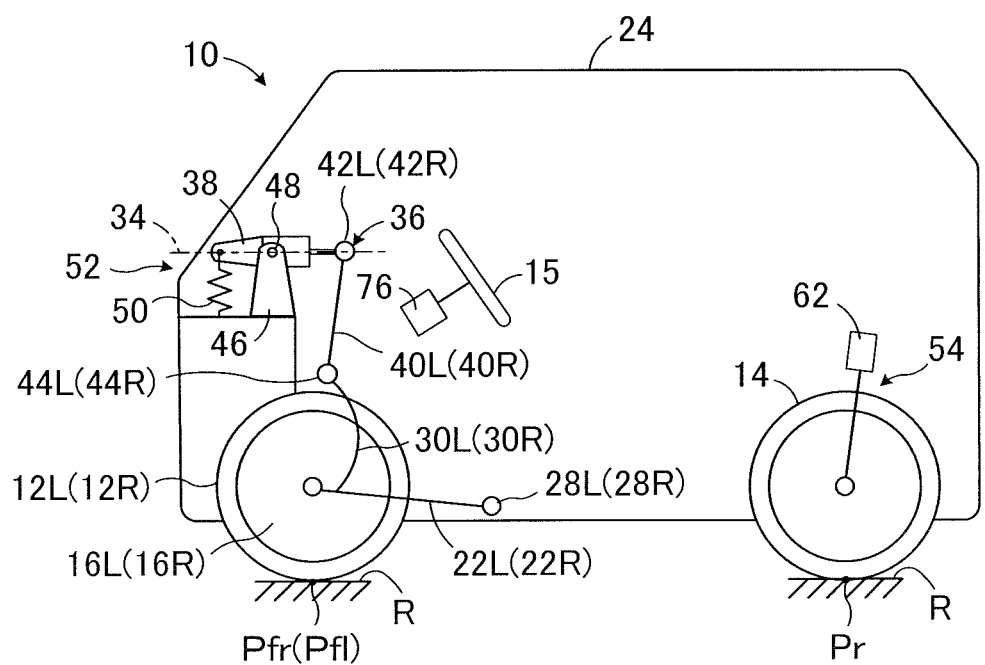
FIG. 3 is a schematic lateral vertical cross-sectional view showing the automatic tilting vehicle of the first embodiment taken along the center vertical cut plane in the front-rear direction.

As shown in FIG. 1 and FIG. 6, the knuckle arms 30L and 30R are linear as viewed in the longitudinal direction, but as shown in FIG. 3, they are substantially C-shaped opened forward as seen in the lateral direction so that they do not interfere with members of the knuckles 16L and 16R. The knuckle arms 30L and 30R may be integrally connected to the knuckles 16L and 16R, respectively, and may be substantially C-shaped opened rearward or linear when viewed in the lateral direction.

A rotational direction and an output of each in-wheel motor are controlled by the electronic control unit 20 according to an operation amount of the shift lever and an accelerator pedal (neither shown) by the driver. Braking forces of the front wheels 12L and 12R and the rear wheel 14 are controlled by the electronic control unit 20 controlling a braking device 32 which operates according to an operation amount of a brake pedal (not shown) by the driver.

The vehicle tilting device 18 includes a swing member 36 swinging about a swing axis 34 extending in the longitudinal direction of the vehicle, a tilt actuator 38 for swinging the swing member 36 about the swing axis 34 and a pair of tie rods 40L and 40R. The tie rods 40L and 40R extend substantially in the vertical direction on both lateral sides of the swing axis 34 and are pivotally connected at their upper ends to the corresponding outer ends of the swing member 36 by joints 42L and 42R. It is preferable that the joints 42L and 42R are joints each including a pivot pin with a rubber bush having an axis extending substantially in the vehicle longitudinal direction, but they may be joints such as ball joints.

Further, the tie rods 40L and 40R are pivotally connected at the lower ends to the upper ends of the knuckle arms 30L and 30R by joints 44L and 44R such as ball joints, respectively. As described above, the knuckle arms 30L and 30R extend substantially upward from the suspension arms 22L and 22R, respectively, so as to extend in the vertical direction with respect to the knuckles 16L and 16R, and move integrally with the corresponding knuckles. Therefore, the lower ends of the tie rods 40L, 40R are integrally connected to the knuckles 16L, 16R via the knuckle arms 30L, 30R and the suspension arms 22L, 22R, respectively.

Figure 2:
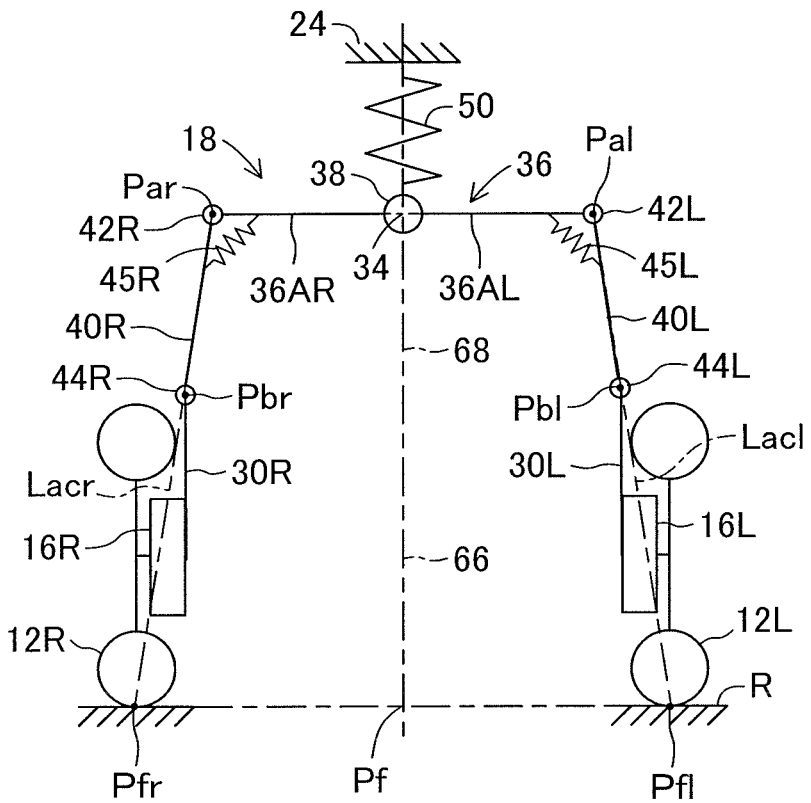
FIG. 2 is a skeleton diagram showing the front wheels and the vehicle tilting device of the first embodiment in a state viewed from the front of the vehicle.

As shown in FIG. 2, centers of the joints 42L and 42R are referred to as pivot points Pal and Par, respectively, centers of the joints 44L and 44R are referred to as pivot points Pbl and Pbr, respectively, and the grounding points of the front wheels 12L and 12R are referred to as the grounding points Pfl and Pfr, respectively. The pivot points Pbl and Pbr are located higher than the upper peripheral portions of tires of the front wheels 12L and 12R, respectively when the vehicle 10 is in a state where the vehicle 10 is stationary or running straight on a horizontal road, the state being referred to as a standard state, but they may be located at a position equal to or lower than the upper peripheral portions of the tires.

When the vehicle 10 is in the standard state, the pivot points Pal and Par, the pivot points Pbl and Pbr, and the grounding points Pfl and Pfr, respectively are symmetrical with respect to a center plane 66 of the vehicle 10. Notably, the center plane 66 is a plane passing through the center in the lateral direction of the vehicle 10 and extending in the longitudinal direction of the vehicle, and extends in the vertical direction when the vehicle is in the standard state. A distance between the pivot points Pbl and Pbr is greater than a distance between the pivot points Pal and Par and less than the distance between the grounding points Pfl and Pfr. The pivot point Pbl is located substantially on a line segment Lacl connecting the pivot point Pal and the grounding point Pfl, and the pivot point Pbr is located substantially on a line segment Lacr connecting the pivot point Par and the grounding point Pfr. The pivot points Pbl and Pbr may not be located on the line segments Lacl and Lacr, respectively.

The swing member 36 has a boss portion 36B rotatable about the swing axis 34 and arm portions 36AL and 36AR integrally formed with the boss portion 36B and extending in opposite directions from the boss portion 36B, and functions as a swing arm member that can swing about the swing axis 34. The effective lengths of the arm portions 36AL and 36AR, that is, the distance between the axis 34 and the pivot point Pbl and the distance between the axis 34 and the pivot point Pbr are the same.

As can be understood from the above descriptions, the left and right front wheels 12L and 12R, the tilt actuator 38, the swing member 36, and the pair of tie rods 40L and 40R are resiliently biased to their positions at which they take in the standard state of the vehicle. An urging means for resiliently urging the above members is made up of elasticity of the suspension arms 22L and 22R, rubber bush devices incorporated in the joints 28L and 28R at the rear ends of the suspension arms, rubber bushings incorporated in the joints 42L and 42R and so on.

Figure 14:
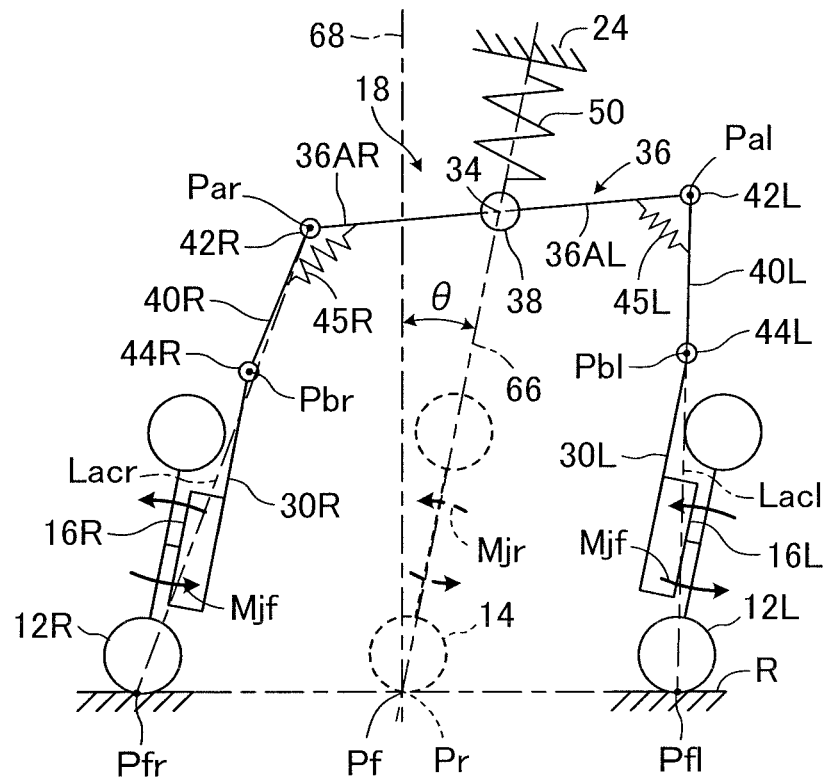
FIG. 14 is a skeleton diagram showing the front wheels and the vehicle tilting device of the embodiment when the tilt angle of the vehicle turning left is an allowable maximum tilt angle, as seen from the front of the vehicle.

In FIGS. 2 and 14, these biasing means are collectively shown as virtual elastic members 45L and 45R. The elastic members 45L and 45R may be considered to generate forces for suppressing the changes where the angles formed by the arm portions 36AL and 36AR and the tie rods 40L and 40R change from the angles in the standard state. That is, when the angle formed by the corresponding arm portion and the tie rod becomes smaller than the angle in the standard state, each elastic member generates a compressive force so as to increase the angle. Conversely, when the angle formed by the corresponding arm portion and tie rod becomes larger than the angle in the standard state, each elastic member generates a tensile force to reduce the angle.

The tilt actuator 38 may be a rotary electric actuator such as a harmonic drive (registered trade mark) including an electric motor 38M such as a DC brushless motor and a reduction gear not shown in the figure.

The output rotary shaft of the actuator 38 protrudes rearward and the boss portion 36B is fixedly attached to the tip of the output rotary shaft so that the rotary motion of the electric motor 38M is transmitted as a swing motion to the swing member 36. The actuator 38 may be a reciprocating type or a swing type actuator. In the former case, a reciprocating motion of the actuator is converted into a swing motion by a motion converting mechanism and is transmitted to the swing member 36.

As shown in FIG. 3, the actuator 38 is arranged between a pair of brackets 46 laterally spaced and fixed to the vehicle body 24. The actuator 38 has a pair of pivot shafts 48 protruding laterally away from each other and is pivotally supported about the pivot shafts 48 as the shafts 48 are rotatably supported by the brackets 46. A suspension spring 50 and a shock absorber (not shown) are interposed between the front end portion of the actuator 38 and the vehicle body 24 below the front end portion. Therefore, the actuator 38 is connected to the vehicle body via the suspension spring 50 and a shock absorber, not shown, so that the actuator 38 can be displaced in the vertical direction with respect to the vehicle body 24 and the displacement and inclination in the lateral direction with respect to the vehicle body are restricted but the actuator can vertically displaceable with respect to the vehicle body 24 at the front end portion and the rear end portion. It should be noted that the suspension spring 50 may be an elastic member such as a compression coil spring.

The suspension spring 50 and the shock absorber cooperate with the suspension arms 22L and 22R and the like to constitute a front wheel suspension 52. Therefore, the front wheels 12L, 12R and the vehicle tilting device 18 are suspended from the vehicle body 24 by the front wheel suspension 52 so that they can move upward and downward with respect to the vehicle body 24 but lateral displacement and inclination with respect to the vehicle body are limited. The impact that the front wheels 12L and 12R are transmitted from a road surface to the vehicle body 24 during traveling of the vehicle is alleviated by the suspension spring 50. The relative vertical vibration between the front wheels 12L and 12R and the vehicle body 24 is attenuated by the shock absorber.

The actuator 38 receives a downward force via the pair of brackets 46 due to gravity acting on the vehicle body 24. However, since the actuator 38 is prevented from being displaced downward by the vehicle tilting device 18, the actuator swings about the pivot shafts 48 so that the rear portion is displaced upward with respect to the vehicle body 24 and the front portion is displaced downward with respect to the vehicle body 24. Therefore, since the suspension spring 50 is compressively deformed, a weight of the vehicle body 24 is supported by a spring force by compression deformation of the suspension spring 50. An amount of compressive deformation of the suspension spring 50 increases when the front wheels 12L and 12R bounce and the rear portion of the actuator 38 is displaced upward, and conversely decreases when the front wheel rebounds and the rear portion of the actuator 38 is displaced downward.

Figure 5:
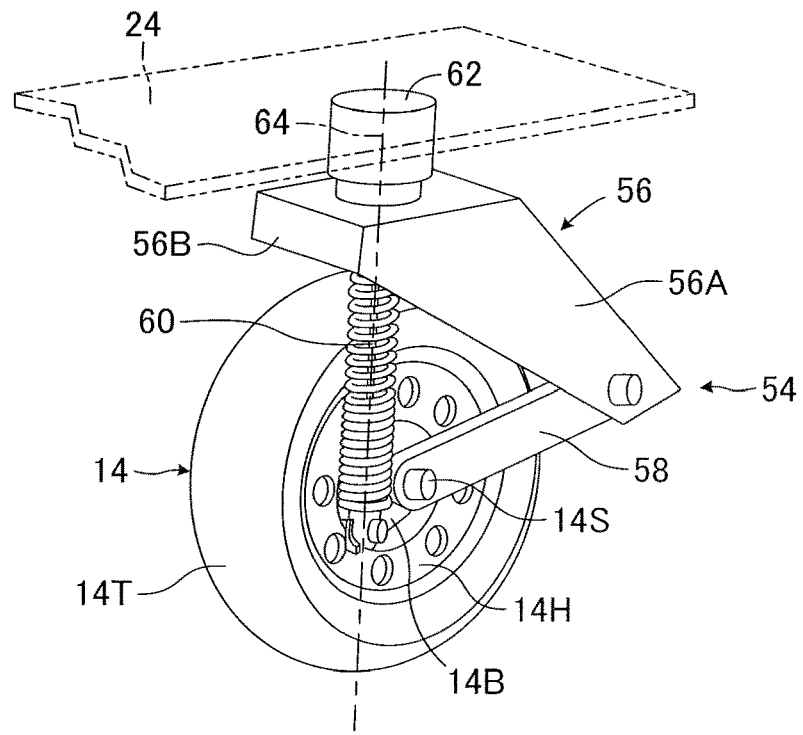
FIG. 5 is an enlarged perspective view showing a rear wheel and a rear wheel suspension according to the first embodiment.

As shown in FIG. 5, the rear wheel 14 includes a wheel 14H and a tire 14T attached to the outer periphery of the wheel, and is suspended from the vehicle body 24 by a rear wheel suspension 54. The rear wheel suspension 54 includes an upper arm member 56 positioned above the rear wheel 14 and a pair of swing arms 58 positioned on both lateral sides of the rear wheel 14. The upper arm member 56 has a base portion 56B and a pair of upper arm portions 56A extending rearward and downward from the base portion on both sides of the rear wheel 14. Each swing arm 58 is pivotally connected to the lower end portion of the corresponding upper arm member 56A at the rear end so as to be vertically pivotable, and rotatably supports a rotation shaft 14S of the rear wheel 14 at the front end. A suspension spring 60 and a shock absorber (not shown) are interposed between a support member 14B that rotatably supports the wheel 14H and the base portion 56B. Therefore, the rear wheel 14 can move up and down with respect to the vehicle body 24, and the relative vertical vibration thereof is attenuated by the shock absorber.

A steering actuator 62 is fixed to the vehicle body 24. The steering actuator 62 is a rotary type actuator and includes an electric motor (not shown) such as a DC brushless motor. A rotating shaft of the electric motor extends downward and the tip of the rotating shaft is integrally connected to the base portion 56B of the upper arm member 56 so that the rotational motion of the electric motor is transmitted to the upper arm member 56. The steering actuator 62 may also be a reciprocating type electric actuator. In that case, the reciprocating motion of the actuator may be converted into a rotational motion by a motion converting mechanism and may be transmitted to the upper arm member 56.

As can be understood from the above descriptions, the rear wheel 14 is suspended from the vehicle body 24 by the rear wheel suspension 54 so as to be able to move up and down with respect to the vehicle body 24 and to be rotatable about a king pin axis 64 which is the same as the axis of the rotation axis of the electric motor of the steering actuator 62. When the vehicle 10 turns, the rear wheel 14 is steered by being rotated about the kingpin shaft 64 by the actuator 62. Since the king pin axis 64 cannot be inclined in the lateral direction with respect to the vehicle body 24, when the vehicle body 24 is tilted in the lateral direction as described later, the rear wheel 14 also inclines in the same lateral direction by the same angle as the vehicle body 24.

As shown in FIG. 6, when the swing member 36 swings about the swing axis 34, the tie rods 40L and 40R vertically move in opposite directions, so that the front wheels 12L and 12R move up and down in opposite directions with respect to the vehicle body 24, whereby the vehicle 10 is inclined in the lateral direction. In FIG. 6, the elastic deformation of the tire due to the action of the centrifugal force acting on the vehicle 10 is shown in an exaggerated manner. Although not shown in FIG. 6, as the tilt angle θ of the vehicle 10 toward the inside of a turn increases, the pivot point Pbr on the turning outer wheel side moves toward the outside in the lateral direction of the vehicle with respect to the line segment Lacr, and conversely, the pivot point Pbl on the turning inner wheel side moves toward the inside in the lateral direction of the vehicle with respect to the line segment Lacl (see FIG. 2).

The knuckle arms 30L and 30R and the tie rods 40L and 40R, when they receive compressive loads for supporting the vehicle body 24 and the vehicle tilting device 18 is operated, the compressive loads increase on the turning outer wheel side and decrease on the turning inner wheel side. The knuckle arms 30L and 30R and the tie rods 40L and 40R are configured so as not to be substantially curved and deformed even if the compressive loads vary due to the operation of the vehicle tilting device 18. That is, the knuckle arms and the tie rods are configured so that even if the compressive loads fluctuate due to the operation of the vehicle tilting device 18, a reduction rate of the distance between the pivot points Pal and Par at the upper end and the pivot points Pbl and Pbr at the lower end is 3% or less, preferably 2% or less, more preferably 1% or less. It should be noted that the reduction rate may be 3% or more in a range of, for example, 10% or less.

Figure 4:
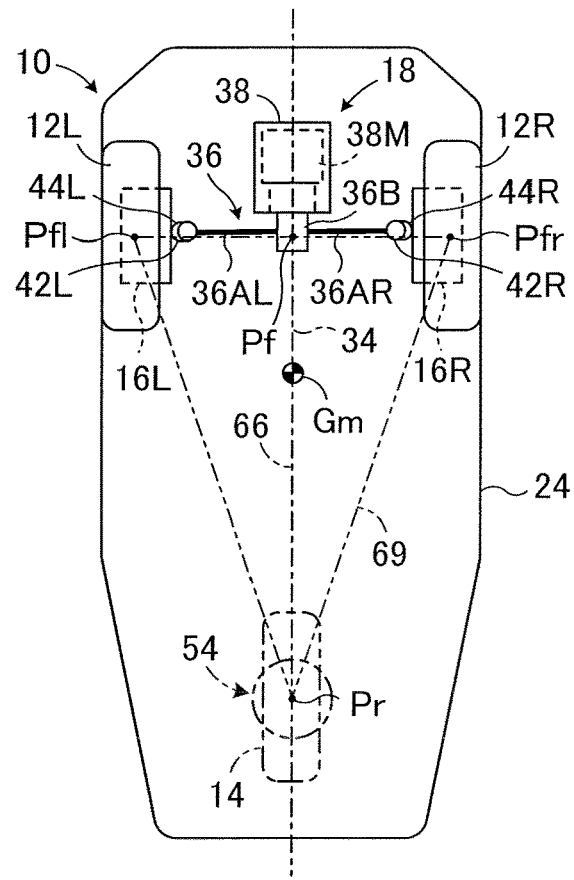
FIG. 4 is a plan sectional view of the automatic tilting vehicle of the first embodiment, taken along a horizontal section.

As shown in FIGS. 4 and 6, a center of gravity Gm of the vehicle 10 in the standard loading state is located behind and lower than the actuator 38 on a vertical center plane 66 of the vehicle. The tilt angle θ of the vehicle 10 is an angle that the center plane 66 forms with respect to the vertical direction 68. As shown in FIG. 4, an isosceles triangle formed by connecting the grounding points Pfl, Pfr of the front wheels 12L, 12R and the grounding point Pr of the rear wheel 14 is referred to as a triangle 69.

A change rate of the tilt angle θ of the vehicle 10, that is, a tilt angular velocity θd (=dθ/dt) of the vehicle, is detected by the gyroscope 70. A signal indicating the tilt angular velocity θd of the vehicle detected by a gyroscope 70 is input to the electronic control unit 20. The tilt angle θ becomes zero when the swing angle of the swing member 36 is zero and the center plane 66 coincides with the vertical direction 68, and becomes a positive value when the vehicle 10 is inclined to the left. The tilt angular velocity θd is a positive value when the tilt angle of the vehicle 10 changes to the left. Furthermore, since the tilt angle θ of the vehicle 10 is substantially the same as a roll angle (not shown) of the vehicle body 24, a roll angle of the vehicle body may be detected as a tilt angle θ of the vehicle 10 by a roll angle sensor.

A steering angle St that is equal to a rotation angle of the steering wheel 15 is detected as a steering operation amount of a driver by a steering angle sensor 72. Further, signals indicating wheel speeds (peripheral speeds) VFL, VFR and VR of the left and right front wheels 12 L, 12R and the rear wheels 14 detected by wheel speed sensors 74FL, 74FR and 74R are input to the electronic control unit 20 and a signal indicating a rotation angle φm of the electric motor 38M detected by a rotation angle sensor 76 is input to the electronic control unit 20.

The electronic control unit 20 calculates a vehicle speed V based on the wheel speeds VFL, VFR and VR, calculates a target steered angle of the rear wheel based on the steering angle St and the vehicle speed V, and controls the rotation angle of the electric motor of the steering actuator 62 of the rear wheel 14 based on the steering angle St and the vehicle speed V so as to steer the rear wheel 14 in a steer-by-wire manner. The rotation angle φm detected by the rotation angle sensor 76 becomes zero when the swing angle of the swing member 36 is zero and becomes a positive value when the swing member 36 swings so that the vehicle 10 tilts to the left.

Although not shown in the figures, a signal indicating an accelerator position Ap which is a depression operation amount of an accelerator pedal operated by the driver is input from an accelerator position sensor to the electronic control unit 20. To the electronic control unit 20, a signal indicating a shift position Sp, which is an operation position of a shift lever operated by the driver, is input from a shift position sensor. In addition, to the electronic control unit 20, signals indicating a longitudinal acceleration Gx, a lateral acceleration Gy, and a vertical acceleration Gz of the vehicle 10 are input from a three-axis acceleration sensor 78, and a signal indicating a yaw rate Yr of the vehicle 10 is input from a yaw rate sensor 79. Further, to the electronic control unit 20, a signal indicating a pedaling force Fp to a brake pedal (not shown) by the driver is input from a pedal effort sensor 80. It should be noted that the longitudinal acceleration Gx is detected as positive acceleration in the forward direction of the vehicle.

The electronic control unit 20 controls the driving force of the front wheels 12L and 12R by controlling the output and rotation direction of the in-wheel motors based on the accelerator position Ap and the shift position Sp. Further, the electronic control unit 20 controls the braking device 32 based on the pedal effort Fp, thereby controlling the braking forces of the front wheels 12L, 12R and the rear wheel 14. During braking, regeneration by in-wheel motors may be performed.

Figure 9:
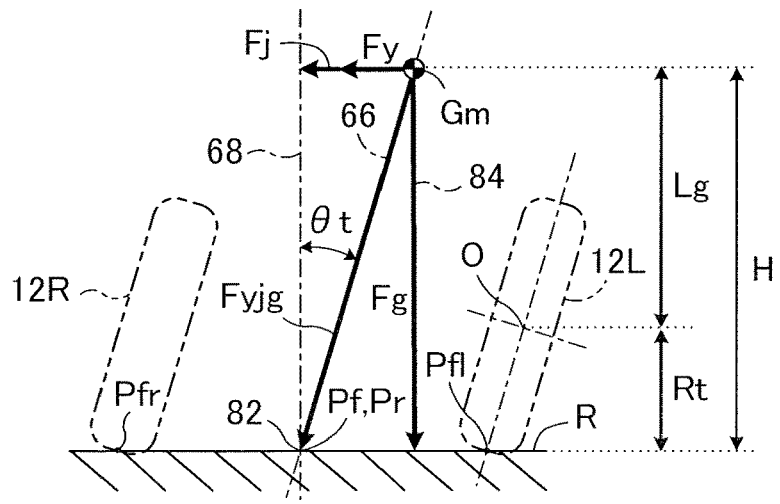
FIG. 9 is an explanatory view showing a relationship between a centrifugal force Fy caused by turning of the vehicle, a lateral force Fj caused by gyro moments of the wheels and the gravity Fg and a target tilt angle δt of the vehicle.

As shown in FIG. 9, it is assumed that a centrifugal force acting on the center of gravity Gm due to turning of the vehicle 10 is Fy and a lateral force acting on the center of gravity Gm due to the gyro moments of the two front wheels and the rear wheel is Fj and the gravity is Fg. As shown in FIG. 9, a straight line connecting a midpoint Pf between the ground points Pfl and Pfr of the left and right front wheels 12L and 12R and the ground point Pr of the rear wheel 14 is defined as a straight line 82. The electronic control unit 20 calculates a target tilt angle θt for tilting the vehicle 10 to the turning inner side so that a resultant force Fyjg of a sum of the centrifugal force Fy and the lateral force Fj and the gravitational force Fg acts in a direction toward the straight line 82 (herein referred to as "predetermined direction").

Figure 7:
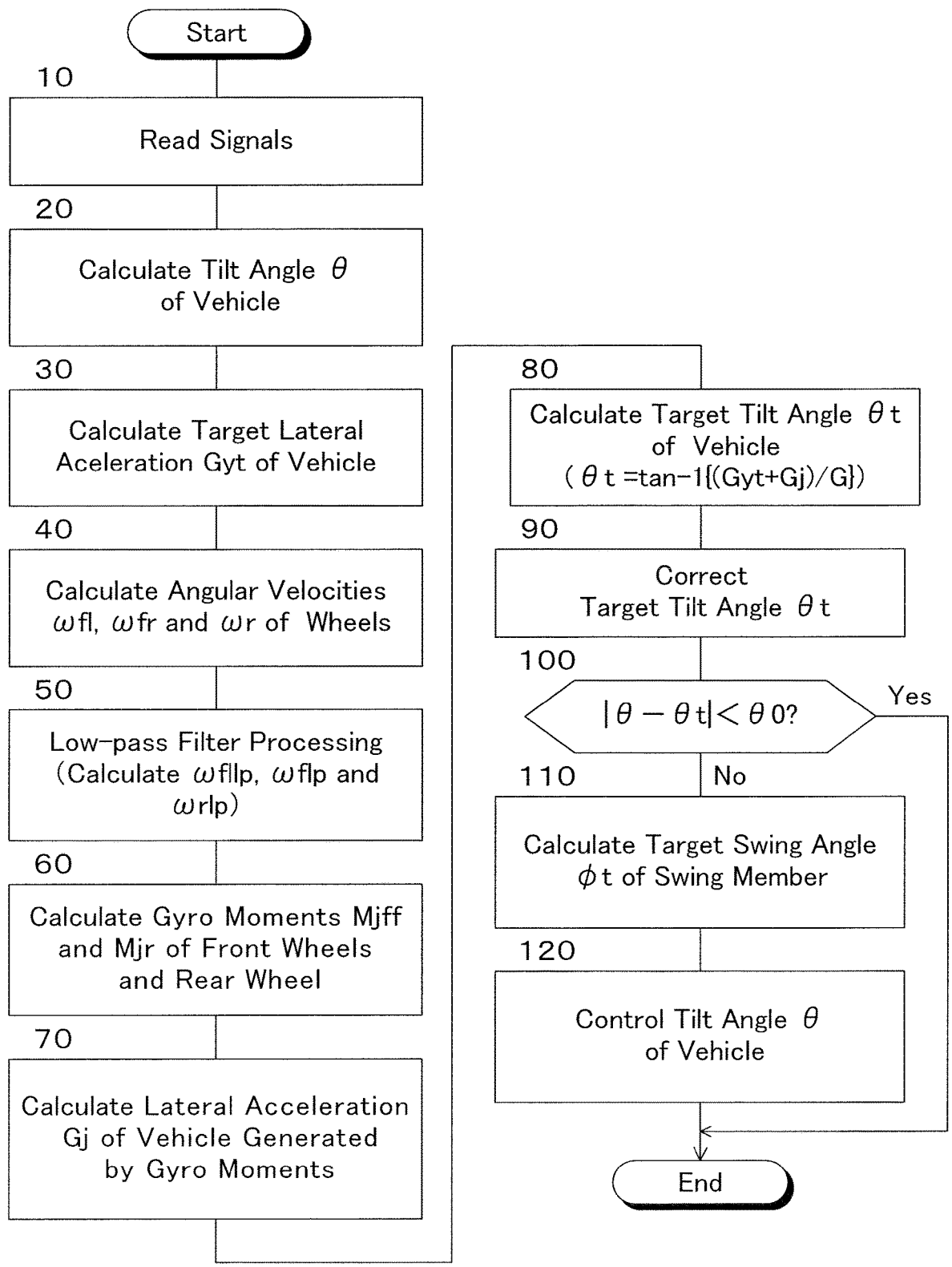
FIG. 7 is a flowchart showing a vehicle tilt angle control routine according to the first embodiment.

More specifically, the electronic control unit 20 calculates a target lateral acceleration Gy of the vehicle in accordance with the flowchart shown in FIG. 7 and calculates a lateral acceleration Gj of the vehicle generated by the gyro momenta of the two front wheels and the rear wheel. In addition, the electronic control unit 20 calculates a target tilt angle θt based on the ratio (Gy+Gj)/G of the sum of the target lateral acceleration Gy and the lateral acceleration Gj to the gravitational acceleration G. Further, the electronic control unit 20 controls the rotation angle φm of the electric motor 38M of the tilt actuator 38 so that the tilt angle θ of the vehicle becomes the target tilt angle θt. Therefore, the electronic control unit 20 functions as a control unit configured to tilt the vehicle 10 by controlling the swing angle φ of the swing member 36 of the vehicle tilting device 18.

Figure 12:
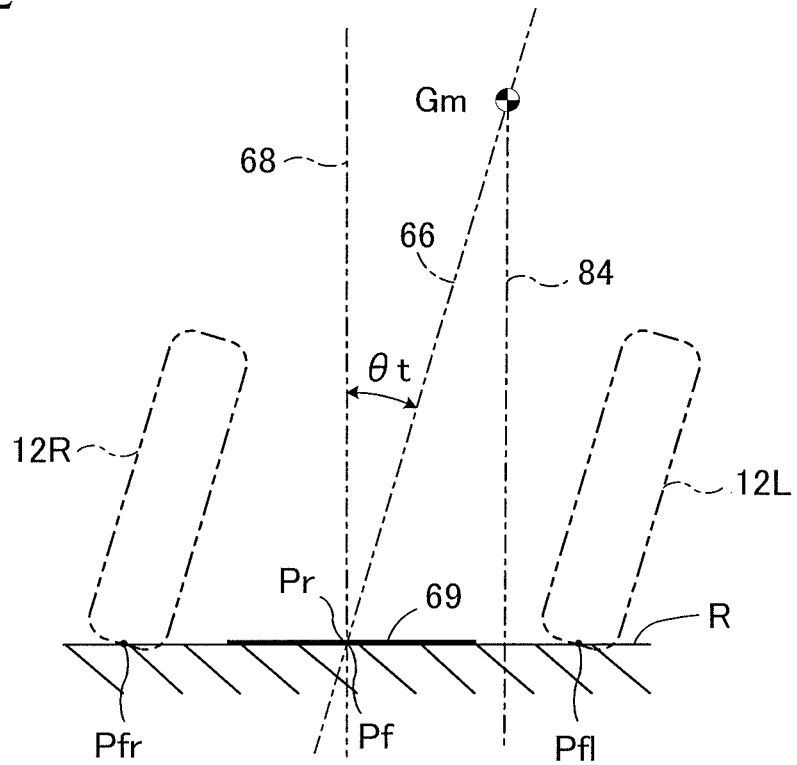
FIG. 12 is a front vertical cross-sectional view showing a situation in which a perpendicular passing through a center of gravity of the vehicle turning left passes through outside a range of a triangle formed by connecting the grounding points of the left and right front wheels and the grounding point of the rear wheels.
Figure 13:
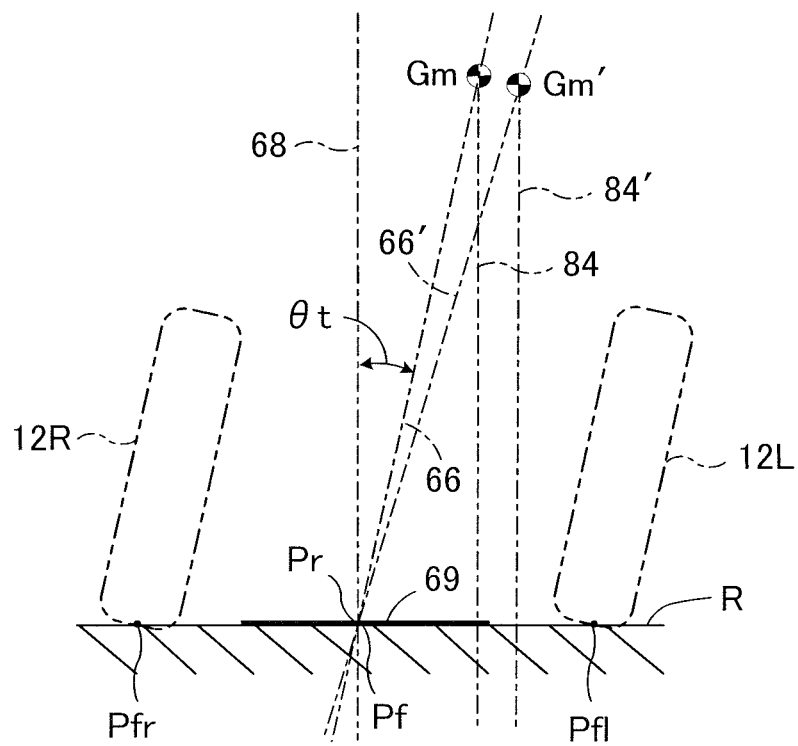
FIG. 13 is a front vertical sectional view showing a situation in which a tilt angle of the vehicle is decreasingly corrected such that a perpendicular passing through a center of gravity of the vehicle turning left passes through inside a tolerable margin of a range of a triangle formed by connecting the grounding points of the left and right front wheels and the grounding point of the rear wheel.

In particular, in the first embodiment, when, as shown in FIG. 12, a perpendicular line 84 passing through the center of gravity Gm of the vehicle 10 passes outside the range of the triangle 69 (see FIG. 4) or through a predetermined tolerable margin, the electronic control unit 20 decreasingly corrects the target tilt angle θt so that, as shown in FIG. 13, the perpendicular line 84 passes inside the tolerable margin. Therefore, the tilt angle of the vehicle when the perpendicular line 84 passes inside an oblique side of the triangle 69 by a distance of the predetermined tolerable margin being referred to as a maximum allowable tilt angle δamax, the target tilt angle θt is corrected as necessary so that a magnitude of the target tilt angle does not exceed the maximum allowable tilt angle θamax. Notably, the predetermined margin is preset in consideration of manufacturing tolerances of various members and the like. Further, in FIG. 13, the positions of the center of gravity Gm, the center plane 66 and the perpendicular line 84 shown in FIG. 12 are indicated by reference symbols Gm', 66' and 84', respectively.

As described above, as the tilt angle θ of the vehicle 10 toward the inside of a turn increases, the pivot point Pbl on the turning outer wheel side moves toward the outside in the lateral direction of the vehicle, and conversely, the pivot point Pbr on the turning inner wheel side moves toward the inside in the lateral direction of the vehicle. Thus, in the first embodiment, as shown in FIG. 14, when the vehicle 10 is tilted to the inside of a turn, the pivot point Pbr is positioned outside the vehicle with respect to the line segment Lacr and the pivot point Pbl is positioned on the line segment Lacl or inside the vehicle with respect to the line segment Lacl.

Figure 8:
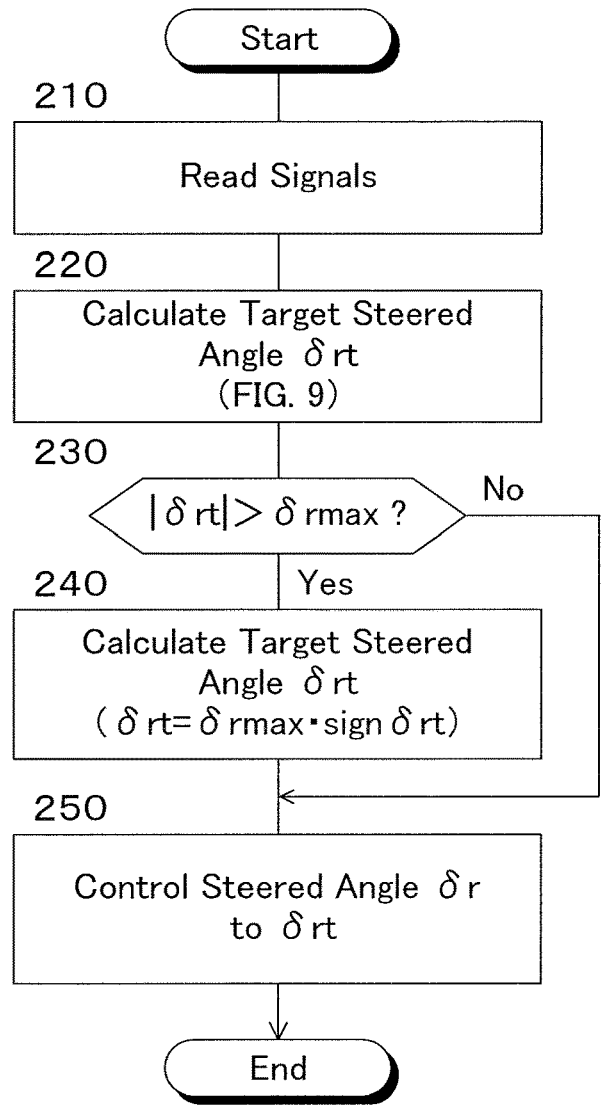
FIG. 8 is a flowchart showing a steered angle control routine of a rear wheel in the first embodiment.

Although the electronic control unit 20 and the sensors such as the gyroscope 70 are shown outside the vehicle 10 in FIG. 1, they are mounted on the vehicle 10. The electronic control unit 20 may be a microcomputer having, for example, a CPU, a ROM, a RAM, and an input/output port device, which are connected to each other by a bi-directional common bus. The control programs corresponding to the flowcharts shown in FIGS. 7 and 8 are stored in the ROM, and the tilt angle θ of the vehicle 10 and the steered angle of the rear wheel 14 are controlled by the CPU according to the control program.

<Vehicle Tilt Angle Control Routine>

Next, a tilt angle control routine of the vehicle in the first embodiment will be described with reference to the flowchart shown in FIG. 7. The tilt angle control according to the flowchart shown in FIG. 7 is repeatedly executed at predetermined time intervals when an ignition switch (not shown) is on.

First, in step 10, signals such as a signal indicating the tilt angular velocity θd of the vehicle detected by the gyroscope 70 are read.

In step 20, a tilt angle θ of the vehicle 10 is calculated by integrating the tilt angular velocity θd of the vehicle detected by the gyroscope 70. When the gyroscope 70 outputs a signal indicating the tilt angle θ of the vehicle 10, the integration of the tilt angular velocity θd is unnecessary.

Figure 10:
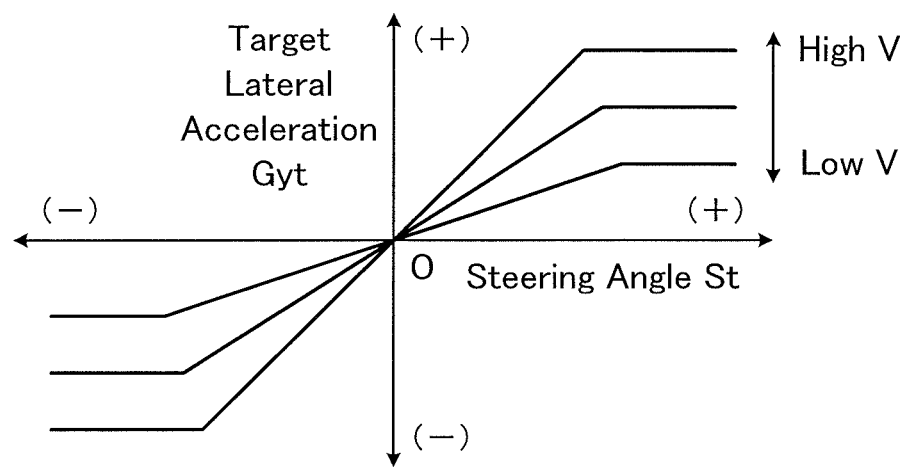
FIG. 10 is a map for calculating a target lateral acceleration Gyt of the vehicle based on a steering angle St and a vehicle speed V.

In step 30, the vehicle speed V is calculated on the basis of the wheel speeds VFL, VFR and VR, and a map shown in FIG. 10 is referred to based on a steering angle St and the vehicle speed V, whereby a target lateral acceleration Gyt is calculated. Further, a centrifugal force Fy acting on the center of gravity Gm of the vehicle 10 by turning is calculated as a product of the target lateral acceleration Gyt and a mass M of the vehicle. Incidentally, as shown in FIG. 10, the target lateral acceleration Gyt is calculated such that the larger an absolute value of the steering angle St is, the larger the magnitude is, and the larger the vehicle speed V is, the larger the magnitude is.

In step 40, angular velocities ωfl, ωfr and ωr of the front left wheel 12L, the front right wheel 12R and the rear wheel 14 are calculated by dividing the wheel speeds Vfl, Vfr and Vr by effective radii Rfl, Rfr and Rr of the front left wheel, the front right wheel and the rear wheel, respectively. When the wheel speeds Vfl, Vfr and Vr are rotational angular velocities, this step is unnecessary since the angular velocities ωfl, ωfr and ωr are the same as the wheel speeds Vfl, Vfr and Vr, respectively.

In step 50, the angular velocities ωfl, ωfr and ωr of the front left wheel, the front right wheel and the rear wheel are low-pass filtered at a first cutoff frequency Fc16, whereby low-pass filtered angular velocities ωfllp, ωflp and ωrlp of the front left wheel, the front right wheel and the rear wheel are calculated. It should be noted that the first cutoff frequency Fc1 is, for example, a value such as 0.5 Hz lower than a second cutoff frequency Fc2 in the second embodiment described later.

In step 60, components Yrfl, Yrfr and Yrr affecting the gyro moments of the front left wheel, the front right wheel and the rear wheel in the yaw rate Yr of the vehicle are calculated according to the following equation (1).

$$Yrfl = Yrfr = Yrr = Yr \cdot \cos\theta \tag{1}$$

Figure 15:
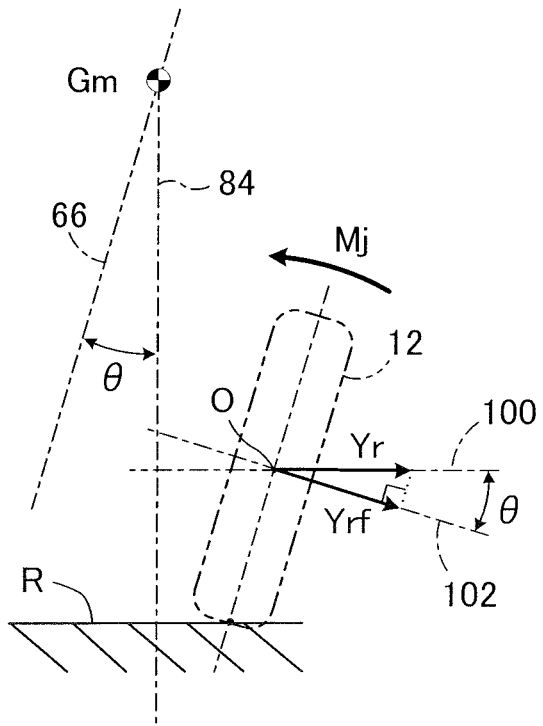
FIG. 15 is a diagram for explaining a relationship between a yaw rate Yr of the vehicle and a component Yrf affecting a gyro moment Mj of a wheel.

When the left and right front wheels have the camber angle θc (positive in the case of negative camber), the components Yrfl and Yrfr for the left front wheel and the right front wheel of the yaw rate Yr of the vehicle affecting the gyro moments are expressed by the following equations (2) and (3). As shown in FIG. 15, the yaw rate Yr of the vehicle at the position of the wheel 12 is a change rate of a yaw of the vehicle in the horizontal plane 100. On the other hand, the component Yrf affecting the gyro moment Mj of the wheel 12 in the yaw rate Yr of the vehicle is a change rate of a yaw in a plane 102 passing through the axis of rotation of the wheel and perpendicular to the center plane of the wheel. Equations (1)-(3) are equations based on the fact that the latter plane 102 is inclined by an angle θ that is equal to the tilt angle of the vehicle with respect to the former plane 100.

$$Yrfl = Yr \cdot \cos(\theta - \theta c) \tag{2}$$

$$Yrfr = Yr \cdot \cos(\theta + \theta c) \tag{3}$$

Further, in step 60, gyro moments Mjff and Mjr of the two front wheels and the rear wheel are calculated according to the following equations (4) and (5), respectively, with inertia moments of the front wheels and the rear wheel as If and Ir, respectively. Notably, the equations (4) and (5) are equations based on the fact that a gyro moment is half a product of the moment of inertia and the angular velocity of the wheel, and cos δr in the expression (5) is a correction coefficient based on the fact that the rear wheel 14 is inclined by the angle δr with respect to the longitudinal direction of the vehicle.

$$Mjff=If(\omega fl \cdot Yrfl+\omega fr \cdot Yrfr)/2 \qquad (4)$$

$$Mjr=If \cdot \omega r \cdot Yrr|\cos \delta r|/2 \qquad (5)$$

In step 70, a lateral acceleration Gj of the vehicle generated by the gyro moments Mjff and Mjr is calculated according to the following equation (6). As shown in FIG. 9, assuming that a height of the center of gravity Gm of the vehicle is H, and an average value of the heights of an intersection points O of the rotation planes of the wheels and the rotation axis for the left and right front wheels is Rt, Lg is a difference H−Rt between the height H and the average value Rt. Assuming that a height of the center of gravity Gm in the standard state of the vehicle is H0 and an average value of the radii of the left and right front wheels is Rt0, the height H and the average value Rt are expressed by the following equations (7) and (8).

$$Gj=\{M/(Mjff+Mjr)\}Lg \qquad (6)$$

$$H=H0 \cdot \cos \theta \qquad (7)$$

$$Rt=Rt0 \cdot \cos \theta \qquad (8)$$

In step 80, a target tilt angle θt of the vehicle for tilting the vehicle 10 toward the turning inner side is calculated according to the following equation (9). The gravitational acceleration G in the following equation (9) may be a positive constant.

$$\theta t=\tan^{-1}\{(Gyt+Gj)/G\} \qquad (9)$$

In step 90, when a magnitude of the target tilt angle θt of the vehicle exceeds the maximum allowable tilt angle θamax, the target tilt angle θt is corrected so that the magnitude becomes the maximum allowable tilt angle θamax. When the magnitude of the target tilt angle θt is equal to or less than the maximum allowable tilt angle θamax, that is, when the perpendicular line 84 passing through the center of gravity Gm of the vehicle 10 passes inside a tolerable margin of the triangle 69 which is not shown in the drawing, the target tilt angle θt of the vehicle is not corrected.

In step 100, it is determined whether or not an absolute value of the deviation θ−θt between the tilt angle θ of the vehicle 10 and the target tilt angle θt of the vehicle is smaller than a reference value θ0 (a positive constant). When the positive determination is made, since the correction control of the tilt angle θ of the vehicle is unnecessary, the tilt angle control is temporarily terminated, and when a negative determination is made, the tilt angle control proceeds to step 110.

In step 110, a target swing angle φt of the swing member 36 for setting the deviation θ−θt between the tilt angle θ of the vehicle 10 and the target tilt angle θt to zero is calculated and a target rotation angle φmt of the electric motor 38M of the tilt actuator 38 for achieving the target swing angle φt is calculated.

In step 120, the electric motor 38M is controlled so that the rotation angle φm of the electric motor 38M becomes the target rotation angle φmt so as to control the swing angle φ of the swing member 36 to the target swing angle φt, whereby the tilt angle θ of the vehicle 10 is controlled so as to be the target tilt angle θt.

As can be understood from the above descriptions, in step 20, a tilt angle θ of the vehicle 10 is calculated based on a tilt angular velocity θd of the vehicle 10 detected by the gyroscope 70. In steps 30 to 80, a target tilt angle θt of the vehicle for tilting the vehicle 10 toward the inside of a turn is calculated. Further, in steps 100 to 120, the electric motor 38M of the tilt actuator 38 is controlled so that a magnitude of a deviation θ−θt between the tilt angle θ of the vehicle 10 and the target tilt angle θt becomes equal to or smaller than the reference value θ0 and a swing angle φ of the swing member 36 reaches a target swing angle φt.

In particular, in step 30, a target lateral acceleration Gyt of the vehicle 10 is calculated based on a steering angle St and a vehicle speed V and in steps 40 to 70, a lateral acceleration Gj of the vehicle generated by the gyro moments Mjff and Mjr of the front wheels and the rear wheel is calculated. In step 80, the target tilt angle θt is calculated based on a ratio (Gy+Gj)/G of a sum of the target lateral acceleration Gy and the lateral acceleration Gj with respect to the gravitational acceleration G. Therefore, the vehicle 10 can be turned steadily by tilting the vehicle 10 toward the inside of a turn so that a resultant force Fyjg of the sum Fy+Fj of the lateral force Fj generated by a centrifugal force Fy caused by the turning of the vehicle 10 and the gyro moments of the wheels and the gravity Fg acts in a predetermined direction, In step 90, when a perpendicular line 84 passing through the center of gravity Gm of the vehicle 10 passes outside the range of the triangle 69, the target tilt angle θt of the vehicle is corrected so that the perpendicular line 84 passes inside a tolerable margin of the triangle 69. Therefore, even if the vehicle is stopped in a state in which the tilt angle θ of the vehicle is controlled so as to be the target tilt angle θt equal to the maximum allowable tilt angle θamax, it is possible to stop the vehicle stably.

<Steering Angle Control Routine of Rear Wheel>

Next, the steered angle control routine of the rear wheel in the first embodiment will be described with reference to the flowchart shown in FIG. 8. The control of the steered angle according to the flowchart shown in FIG. 8 is also repeatedly executed at predetermined time intervals when the ignition switch not shown in the drawing is on.

First, in step 210, a signal such as a signal indicating the steered angle St detected by the steered angle sensor 72 is read.

In step 220, a target steered angle δrt of the rear wheel 14 is calculated based on the target lateral acceleration Gyt and the vehicle speed V of the vehicle 10 with the wheel base of the vehicle 10 as L, according to the following formula (10).

$$\delta rt=\tan^{-1}(L \cdot Gyt/V^2) \qquad (10)$$

Figure 11:
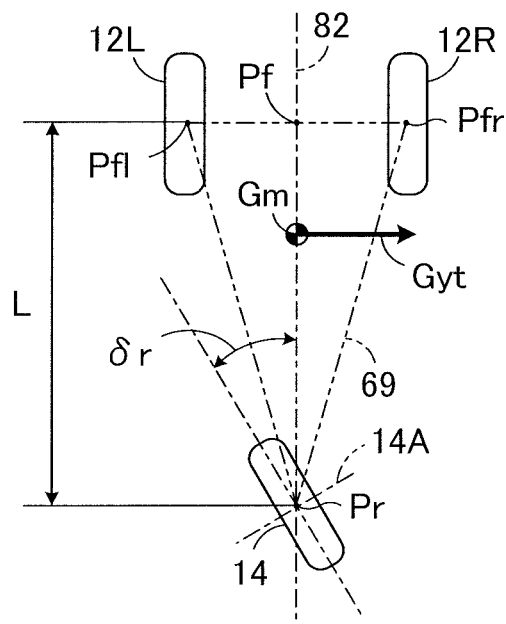
FIG. 11 is a view for explaining a wheel base of the vehicle and a steered angle δr of the rear wheel.

As shown in FIG. 11, the wheel base L of the vehicle 10 is the distance between the midpoint Pf of the ground points Pfl and Pfr of the left and right front wheels 12L and 12R and the ground point Pr of the rear wheel 14. The steered angle δr of the rear wheel 14 is an angle formed by the rotation center plane of the rear wheel 14 at the position of the rotation axis 14A with respect to the straight line 82 connecting the midpoint Pf of the vehicle and the ground point Pr of the rear wheel 14 Yes, the target steered angle δrt is the target value of the steered angle δr. In FIG. 11, for the sake of clarity, each wheel is shown not being tilted.

In step 230, it is determined whether or not the absolute value of the target steered angle δrt of the rear wheel 14 exceeds the limit value δrmax (positive constant), that is, the magnitude of the steered angle δr of the rear wheel 14 is restricted It is determined whether or not it should be carried out. When a negative determination is made, the control of the steered angle proceeds to step 250, and when the determination is affirmed, the control of the tilt angle proceeds to step 240.

In step 240, the target steered angle δrt of the rear wheel 14 is calculated according to the following equation (11). In the following expression (11), sign δrt means the sign of the target steered angle δrt with the left turning direction of the vehicle 10 being positive.

$$\delta rt = \delta rmax \cdot sign\delta rt \tag{11}$$

In step 250, the steering actuator 62 is controlled so that the steered angle δr of the rear wheel 14 becomes the target steered angle δrt.

As can be understood from the above description, in step 220, the target steered angle δrt of the rear wheel 14 is calculated based on the target lateral acceleration Gyt and the vehicle speed V of the vehicle 10, and in a step 250, the steered angle δr of the rear wheel 14 And is controlled so as to be the target steered angle δrt. Therefore, the steered angle δr of the rear wheel 14 can be controlled according to the steered angle St indicating the steering operation amount of the driver and the vehicle speed V.

In particular, if it is determined in step 230 that the absolute value of the target steered angle δrt of the rear wheel 14 exceeds the limit value δrmax, in step 240 the magnitude of the target steered angle δrt of the rear wheel 14 is limited to the limit value δrmax. Therefore, it is possible to reliably prevent the steered angle δr of the rear wheel 14 from becoming excessive.

<Problem Due to Gyro Moments Acting on Wheels>

As described above, in a conventional automatic tilting vehicle, particularly in the conventional improved automatic tilting vehicle, there are problems that a consumption energy of the tilt actuator 38 is large due to an influence of gyro moments acting on the left and right front wheels 12L and 12R. Furthermore, it is difficult to accurately control the tilt angle θ of the vehicle to a target tilt angle θt of the vehicle, and thus, there is a problem that the controllability of the tilt angle of the vehicle is not good. The problem will be described with reference to FIGS. 14, 16 and 17.

FIG. 14 is a skeleton diagram showing a state in which the vehicle 10 is tilted. Since the tilt actuator 38 is supported so as to pivot about the pivot shafts 48, when the swing member 36 is displaced downward and the rear portion of the actuator 38 is lowered, the front portion of the actuator 38 is raised and the suspension spring 50 expands. In FIGS. 2, 10, and 11, the suspension spring 50 is shown on the upper side of the actuator 38 so that the vertical displacement of the swing member 36 corresponds to the expansion and contraction deformation of the suspension spring 50.

When a magnitude of the tilt angle θ of the vehicle 10 is a large value such as the maximum allowable tilt angle θamax, the pivot point Pbr on the turning outer wheel side is located laterally outwardly of the line segment Lacr connecting the pivot point Par and the grounding point Pfr. The pivot point Pbl on the turning inner wheel side is located on or laterally inside the line segment Lacl connecting the pivot point Pal and the grounding point Pfl.

For example, when the vehicle 10 turns to the left, the swing member 36 is swung in the counterclockwise direction about the swing axis 34 as viewed from the front of the vehicle by a rotational torque of the actuator 38 so that the side of the turning outer wheel becomes lower. As a result, the tie rod 40R on the turning outer wheel side is pushed downwardly with respect to the vehicle body 24, and the tie rod 40L on the turning inner wheel side is lifted upward with respect to the vehicle body 24, resulting in that the entire vehicle 10 is tilted toward the inside of a turn. Therefore, the front wheels 12L and 12R and the rear wheel 14 are inclined toward the inside of the turn by substantially the same angle as the vehicle body 24.

When the front wheels 12L and 12R and the rear wheel 14 are inclined, gyro moments Mjf and Mjr act on the front wheels and the rear wheel, respectively, and the front wheels and the rear wheel tend to return to the positions of the front wheels and the position of the rear wheel when the vehicle 10 is in the standard state. Since the front wheels 12L and 12R each incorporate an in-wheel motor and the mass of each front wheel is larger than the mass of the rear wheel 14, the gyro moments Mjf are larger than the gyro moment Mjr.

The front wheels and the rear wheel are in contact with a road surface R at grounding points, and, accordingly, they cannot be displaced in the lateral direction with respect to the road surface, the front wheels 12L and 12R attempt to pivot counterclockwise around the grounding points Pfl and Pfr, respectively by the action of the gyro moments. Notably, the rear wheel 14 also attempts to pivot counterclockwise around the grounding point Pr. Accordingly, since the pivot points Pbl and Pbr attempt to rotate in the counterclockwise direction around the grounding points Pfl and Pfr, respectively, the pivot points Pal and Par are subjected to leftward and downward forces via the tie rods 40L and 40R, respectively. Therefore, the actuator 38 receives a leftward and downward force from the swing member 36, and the force acts to reduce the tilt angle θ of the vehicle 10.

Further, the gyro moments Mjf are transmitted to the vehicle body 24 via the suspension arms 22L and 22R, and the gyro moment Mjr is transmitted to the vehicle body 24 via the rear wheel suspension. Since these gyro moments tend to reduce the inclination of the vehicle body 24, they act to reduce the tilt angle θ of the vehicle 10.

In the conventional automatic tilting vehicle, the target tilt angle θt of the vehicle is calculated according to the following equation (12) based on a target lateral acceleration Gyt and the gravitational acceleration G of the vehicle.

$$\theta t = \tan^{-1}(Gyt/G) \tag{12}$$

Figure 16:
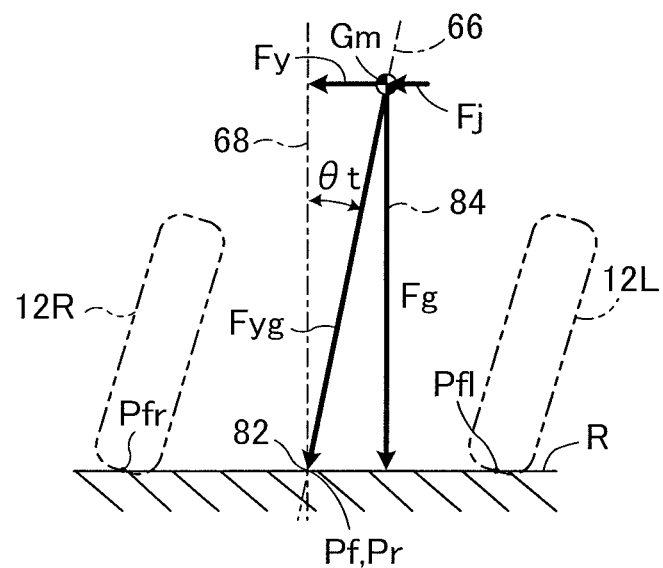
FIG. 16 is a diagram showing a relationship between a force acting on the center of gravity Gm and a target tilt angle θt of the vehicle in a conventional automatic tilting vehicle.

FIG. 16 shows the relationship between a force acting on the center of gravity Gm and the target tilt angle θt of the vehicle for the conventional automatic tilting vehicle. The target lateral acceleration Gyt of the vehicle in the equation (12) corresponds to the centrifugal force Fy caused by the turning of the vehicle (Gyt=Fy/M) and the gravitational acceleration G corresponds to the gravity Fg (G=Fg/M). Therefore, in r the conventional automatic tilting vehicle, as shown in FIG. 16, the target tilt angle θt is calculated such that a resultant force Fyg of the centrifugal force Fy and the gravitational force Fg acts in a predetermined direction toward the straight line 82.

However, the lateral force Fj caused by the gyro moments Mjf and Mjr acts on the center of gravity Gm. Consequently, the actuator 38 must not only swing the swing member 36 so that the tilt angle θ of the vehicle 10 becomes the target tilt angle θt, but also generate a force to maintain the tilt angle θ at the target tilt angle θt against the lateral force Fj. Therefore, an energy consumed by the actuator 38 is larger than in the case where the gyro moments Mjf and Mjr do not act on the left and right front wheels 12L and 12R and the rear wheel 14.

Also, when the pivot points Pal and Par are subjected to leftward and downward forces via the tie rods 40L and 40R, the swinging member 36 is displaced downward along the center plane 66 with respect to the vehicle body 24, so that the front end of the actuator 38 is also displaced downward, and a height of the vehicle body 24 is lowered. In addition, since a rotational speed of the front wheel 12R as the turning outer wheel is higher than a rotational speed of the front wheel 12L as the turning inner wheel, a magnitude of the gyro moment acting on the front wheel 12R is larger than the magnitude of the gyro moment acting on the front wheel 12L. Accordingly, since the gyro moments acting on the front wheels 12L and 12R act to increase the distance between the pivot points Pbl and Pbr, the quadrilateral Pal-Pbl-Pbr-Par increases its base so that a height of the upper side Pal-Par decreases. Therefore, also by this action, the swing member 36 is displaced downward along the center plane 66 with respect to the vehicle body 24, and the height of the vehicle body 24 is lowered.

When the height of the vehicle body is lowered, the center of gravity Gm of the vehicle 10 is displaced downward along the center plane 66 and the turning radius of the center of gravity increases as compared to where the center of gravity Gm is not displaced downward, resulting in that an actual lateral acceleration Gy decreases. Therefore, since a deviation between the target lateral acceleration Gyt and the actual lateral acceleration Gy of the vehicle becomes large, even if the vehicle tilting device 18 is controlled so that the tilt angle θ of the vehicle 10 becomes a target tilt angle θt, it is difficult to control the tilt angle of the vehicle accurately to the target tilt angle.

Further, when the pivot points Pal and Par receive leftward and downward forces via the tie rods 40L and 40R, respectively, a positional relationship between the swing member 36 and the tie rods 40L and 40R becomes different from that in the standard state of the vehicle 10. As a result, amounts of elastic deformation of the elastic members 45L and 45R elastically urging the swing member 36, the tie rods 40L and 40R, etc. to the positions in the standard state of the vehicle 10 change from their original values, which accumulate elastic energy.

An elastic energy accumulated by the elastic members 45L and 45R is kept constant unless the turning state of the vehicle 10 changes. On the other hand, when the vehicle is rapidly decelerated and rotational speeds of the front wheels 12L and 12R and the rear wheel 14 rapidly decrease in a situation where the vehicle 10 is turning, the gyro moments Mjf acting on the front wheels 12L and 12R and the gyro moment Mjr acting on the rear wheel 14 also decrease sharply. As a result, the accumulated elastic energy is abruptly released, so that the amounts of deformation of the elastic members 45L and 45R sharply decrease so as to become original values, and the swing member 36 tends to displace upward along the center plane 66 with respect to the vehicle body 24.

Consequently, the vehicle body 24 rapidly displaces upward along the center plane 66, a height of the center of gravity Gm of the vehicle 10 abruptly increases, and a compression deformation amount of the suspension spring 50 abruptly increases. Accordingly, since the elastic deformation amounts of the elastic members 45L and 45R and the suspension spring 50 vibratorily increase and decrease, the height of the center of gravity Gm of the vehicle 10 vibrates, and an actual lateral acceleration Gy of the vehicle also vibrates. Therefore, even if the vehicle tilting device 18 is controlled so that the tilt angle θ of the vehicle 10 becomes the target tilt angle θt, the tilt angle θ of the vehicle vibrates and it is difficult to control the tilt angle of the vehicle accurately to the target tilt angle δt.

Figure 17:
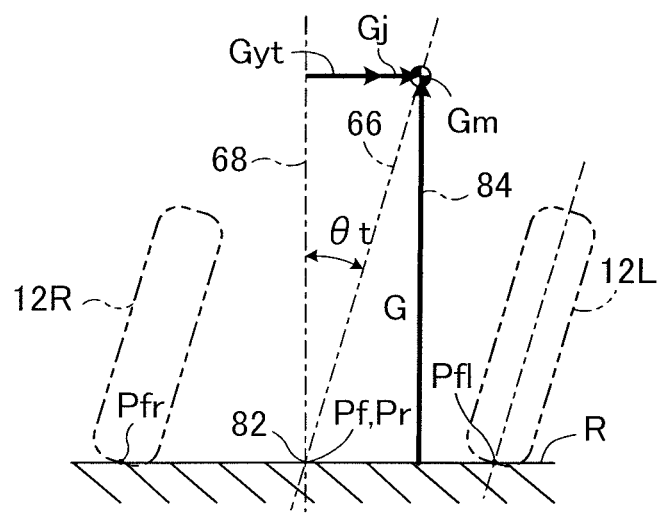
FIG. 17 is a diagram showing a relationship between a target tilt angle θt, a target lateral acceleration Gyt of the vehicle, a lateral acceleration Gj caused by the gyro moments, and the gravitational acceleration G in the first embodiment.

Reduction of Energy Consumption and Improvement of Controllability of the Tilt Angle θ of the Vehicle in the First Embodiment In the first embodiment, the target tilt angle θt of the vehicle is calculated to a value more preferable than the conventional one in which the lateral acceleration Gj caused by the gyro moment is taken into account by being calculated according to the above formula (9). The relationship between the target tilt angle θt, the target lateral acceleration Gyt of the vehicle 10, the lateral acceleration Gj caused by the gyro moment, and the gravitational acceleration G is as shown in FIG. 17. The lateral acceleration Gj caused by the gyro moment corresponds to the lateral force Fj caused by the gyro moment (Gj=Fj/M). Therefore, the relationship between the target tilt angle θt, the centrifugal force Fy, the lateral force due to the gyro moment Fj and the gravity Fg is as shown in FIG. 9.

As can be seen from the comparison between FIG. 9 and FIG. 16, in the first embodiment, when a tilt angle θ of the vehicle is controlled so that the tilt angle θ becomes the target tilt angle θt, the actuator 38 does not need to generate a force against the lateral force caused by the gyro moment. Therefore, the energy consumed by the actuator 38 can be reduced.

Since the actuator 38 does not need to generate a force against the lateral force Fj caused by the gyroscopic moment, it is possible to reduce the degree of the positional relationship between the rocking member 36 and the tie rods 40L and 40R different from that in the standard state of the vehicle 10. Therefore, it is possible to reduce, as compared with the prior art, an amount of accumulated energy which is generated by the fact that elastic deformation amounts of the elastic members 45L and 45R elastically biasing the swing member 36, the tie rods 40L and 40R, etc. to the positions in the standard state of the vehicle 10 become different from original values.

Consequently, even if the vehicle is decelerated suddenly, an amount of elastic energy released when rotational speeds of the front wheels abruptly decrease can be reduced. Therefore, a vibration of a height of the center of gravity Gm of the vehicle 10 caused by vibratorily increasing or decreasing amounts of elastic deformations of the elastic members 45L and 45R and the suspension spring 50 can be reduced, and a vibration of an actual lateral acceleration Gy of the vehicle can be reduced. Therefore, the vibration of the tilt angle θ of the vehicle can be reduced, which also enables to improve the controllability of the tilt angle θ of the vehicle.

Although not shown in the drawing, even when the vehicle 10 turns to the right, except that the inner and outer turning wheels are opposite to those at the time of left turn of the vehicle, energy consumption by the actuator 38 can be reduced by the same action and the controllability of the tilt angle θ of the vehicle can be improved.

In particular, according to the first embodiment, the gyro moments Mjff and Mjr of the two front wheels and the rear wheels are calculated in step 60, and the lateral acceleration Gj due to the gyro moment used for the calculation of the target tilt angle θt is calculated 70 are computed based on Mjff and Mjr. Therefore, it is possible to calculate the target tilt angle θt to a more preferable value as compared with the case where the lateral acceleration Gj caused by the gyro moment is calculated without considering, for example, the gyro moment Mjr of the rear wheel. Therefore, the energy consumed by the actuator 38 can be effectively reduced, and the controllability of the tilt angle of the vehicle can be effectively improved.

Further, according to the first embodiment, the gyro moments Mjff and Mjr of the two front wheels and the rear wheels are calculated based on wheel speeds Vfl, Vfr and Vr of the front and rear wheels and a yaw rate Yr of the vehicle in steps 40 to 60. Therefore, compared to where the gyro moments Mjff and Mjr of the two front wheels and the rear wheel are calculated based on wheel speeds Vfl, Vfr and Vr of the two front wheels and the rear wheel and the target tilt angle θt of the vehicle, gyro moments Mjff and Mjr can be precisely calculated in accordance with an tilt angle θ of the vehicle and, accordingly, in accordance with an actual tilt angle of the vehicle. Therefore, the energy consumed by the actuator 38 can be effectively reduced, and the controllability of the tilt angle of the vehicle can be effectively improved. Notably, gyro moments Mjff and Mjr may be calculated based on wheel speeds Vfl, Vfr and Vr of the two front wheels and the rear wheel and a target tilt angle θt of the vehicle.

Further, according to the first embodiment, gyro moments Mjff and Mjr of the two front wheels and the rear wheel are calculated based on wheel speeds Vfl, Vfr and Vr of the front wheels and the rear wheel, a yaw rate Yr of the vehicle and a tilt angle θ of the vehicle in steps 40 to 60. Therefore, a target tilt angle θt can be calculated to a more desirable value as compared to where gyro moments Mjff and Mjr of the front wheels and the rear wheel are calculated without considering a tilt angle θ of the vehicle. Therefore, an energy consumed by the actuator 38 can be effectively reduced, and the controllability of the tilt angle of the vehicle can be effectively improved.

Further, according to the first embodiment, in step 90, when the magnitude of a target tilt angle θt of the vehicle exceeds the maximum allowable tilt angle θamax, the target tilt angle θt is corrected so that the magnitude becomes the maximum allowable tilt angle θamax. Therefore, it is possible to reliably prevent a magnitude of a target tilt angle θt of the vehicle from exceeding the maximum allowable tilt angle θamax.

Further, according to the first embodiment, angular velocities ωfl, ωfr and ωr of these wheels, which are used for calculating gyro moments Mjff and Mjr of the front wheels and the rear wheel, are low-pass filtered at a first cutoff frequency Fc1. Therefore, it is possible to prevent the gyro moments Mjff and Mjr and the lateral acceleration Gj of the vehicle from suddenly changing due to a sudden change in the wheel speed, and to prevent sudden change of a target tilt angle θt of the vehicle, so that a sudden change in a tilt angle of the vehicle can be prevented to improve the ride comfort of the vehicle.

The first cutoff frequency Fc1 is smaller than the second cutoff frequency Fc2 in the second embodiment described later. Therefore, it is possible to effectively perform the low-pass filter processing on angular velocities ωfl, ωfr and ωr of the wheels as compared to where the first cut-off frequency Fc1 is equal to or more than the second cut-off frequency Fc2, for example.

Second Embodiment

Figure 18:
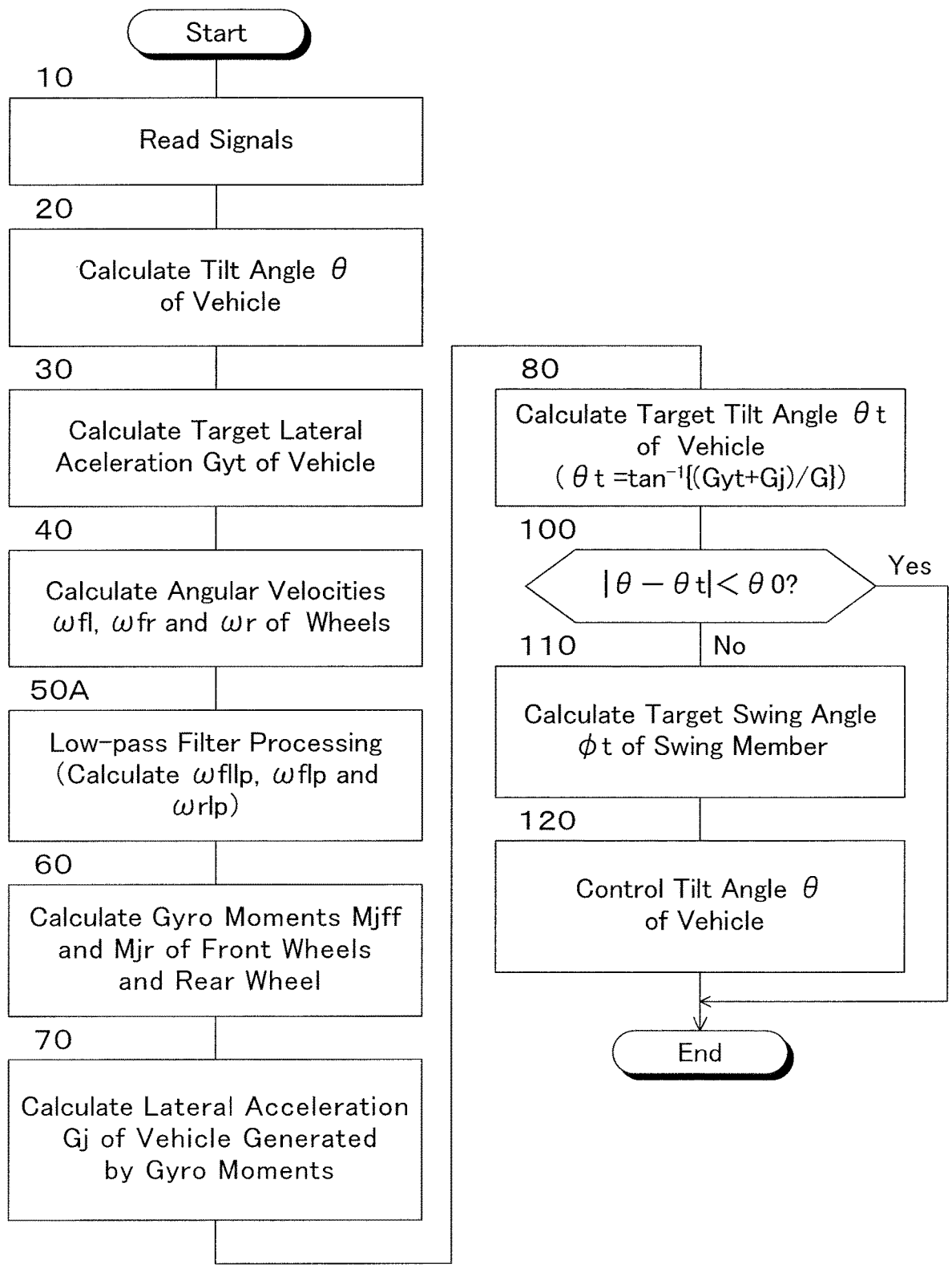
FIG. 18 is flowchart showing a control routine of the tilt angle of the vehicle in a second embodiment of the automatic tilting vehicle according to the present invention.

FIG. 18 is a flowchart showing a control routine for controlling the tilt angle of the vehicle according to the second embodiment of the automatic inclined vehicle according to the present invention. In FIG. 18, the same step numbers as those shown in FIG. 7 are assigned to the same steps as those shown in FIG. 7. Further, the configuration of the second embodiment relating to the control routine of the tilt angle of the vehicle and the control routine of the steered angle of the rear wheel is the same as that of the first embodiment.

As can be understood from the comparison between FIG. 18 and FIG. 7, in the second embodiment, step 90 in the first embodiment is not executed, and upon completion of step 80, the control of the tilt angle proceeds to step 100. Therefore, since the magnitude of the target tilt angle θt of the vehicle is not limited, the magnitude of the target tilt angle θt may become larger than the maximum allowable tilt angle θamax.

In the second embodiment, step 50A is executed instead of step 50 in the first embodiment. In step 50A, angular velocities ωfl, ωfr, and ωr of the left front wheel, the right front wheel, and the rear wheel are subjected to a low-pass filter processing at a second cutoff frequency Fc2, so that angular velocities ωfllp, ωfrlp and ωrlp of the left front wheel, the right front wheel, and the rear wheel are calculated. The second cutoff frequency Fc2 is a value higher than the first cutoff frequency Fc1 in the first embodiment, for example, 3 Hz.

Although not shown as a flowchart, steps 230 and 240 of the control routine of the steered angle of the rear wheels in the first embodiment are not executed, and when the step 220 is completed, control of the steered angle of the rear wheels proceeds to step 250. Therefore, since the magnitude of the target steered angle δrt of the rear wheel 14 is not limited, the magnitude of the target steered angle δrt sometimes becomes larger than the limit value δrmax.

According to the second embodiment, since the magnitude of the target tilt angle θt of the vehicle is not limited, the magnitude of the target tilt angle θt is permitted to be larger than the maximum allowable tilt angle θamax. Therefore, for example, in a situation where a turning lateral force acting on the vehicle is large due to a high vehicle speed V and/or a large magnitude of steered angle St, a magnitude of the tilt angle θ of the vehicle can be increased, so that the turning performance of the vehicle can be improved as compared with the first embodiment.

In particular, according to the second embodiment, in step 50A, angular velocities ωfl, ωfr and ωr of the left front wheel, right front wheel and rear wheel are low-pass filtered at the second cutoff frequency Fc2. The second cutoff frequency Fc2 is larger than the first cutoff frequency Fc1 in the first embodiment. Consequently, compared with the first embodiment, it is possible to reduce an effect of the low-pass filtering process and quickly change a target tilt angle θt so that the target tilt angle becomes a value suitable for the traveling condition of the vehicle without delay. Therefore, for example, even when a vehicle speed and/or a steering operation amount of a driver rapidly changes, a tilt angle θ of the vehicle can be controlled so that the tilt angle becomes a tilt angle suitable for the traveling condition of the vehicle, and good cornering performance can be secured.

Third Embodiment

Figure 19:
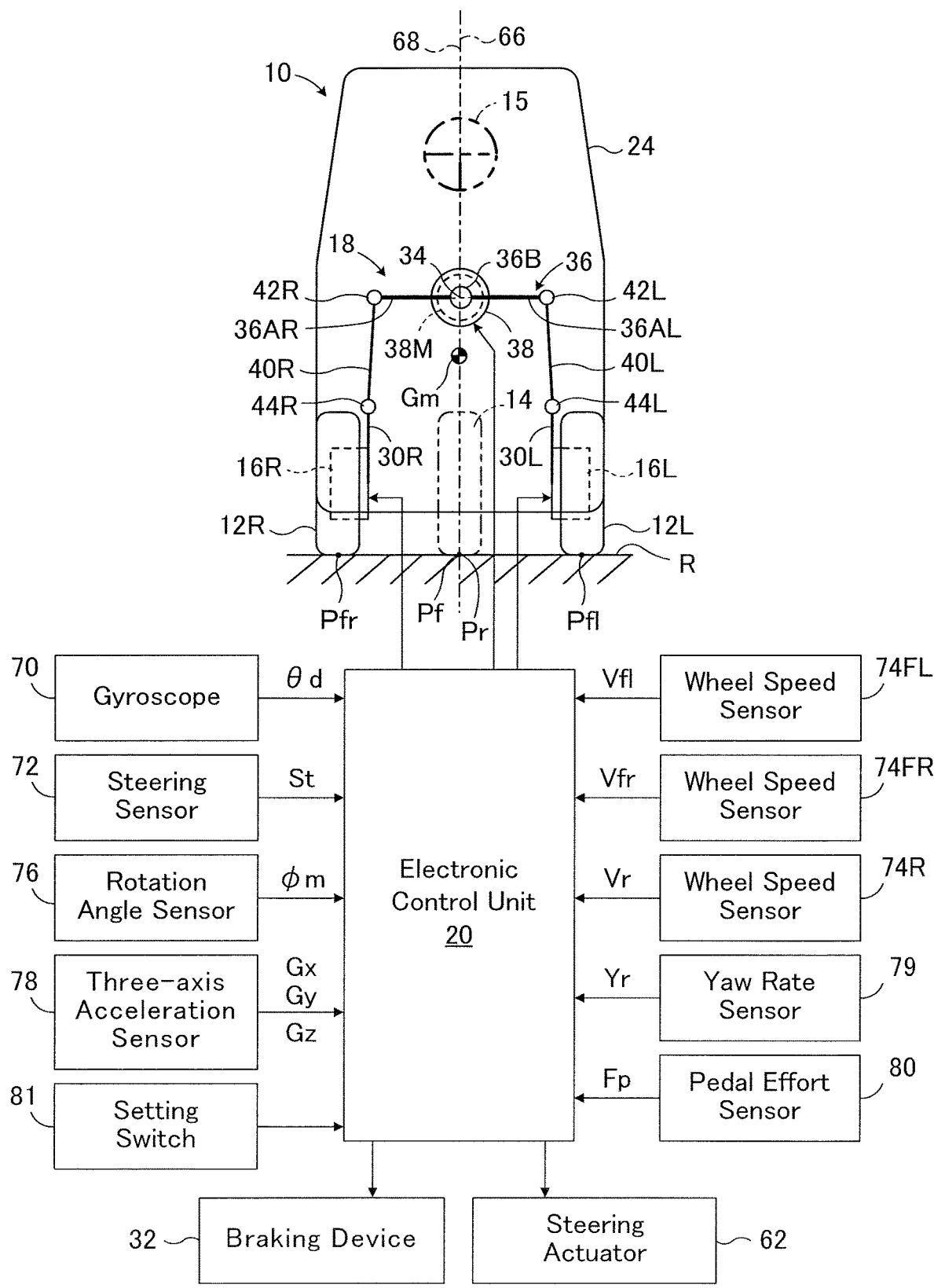
FIG. 19 is a schematic configuration diagram showing a third embodiment of the automatic tilting vehicle according to the present invention.

FIG. 19 is a schematic configuration diagram showing a third embodiment of the automatic inclined vehicle according to the present invention. In FIG. 19, the same reference numerals as those denoted in FIG. 1 are given to the same members as those shown in FIG. 1.

As can be understood from the comparison between FIG. 19 and FIG. 1, in the third embodiment, the vehicle 10 is provided with a setting switch 81 operated by the occupant, and the setting switch 81 functions as a setting device for setting whether or not to limit a magnitude of the target tilt angle θt of the vehicle. This switch is switched between on and off, and when it is on, it is set to limit the magnitude of the target tilt angle θt.

In the third embodiment, when the setting switch 81 is on, a tilt angle θ of the vehicle 10 and a steered angle δr of the rear wheel 14 are controlled in the same manner as in the above-described first embodiment. On the other hand, when the setting switch 81 is off, a tilt angle θ of the vehicle 10 and a steered angle δr of the rear wheel 14 are controlled in the same manner as in the above-described second embodiment.

According to the third embodiment, by operating the setting switch 81, an occupant of the vehicle 10 can select and switch between the control mode of the first and second embodiments to control the tilt angle θ of the vehicle 10 and the steered angle δr of the rear wheel 14.

Furthermore, according to the third embodiment, when the setting switch 81 is on, it is possible to obtain the same operational effect can be obtained as in the first embodiment described above and when the setting switch 81 is off, the same operational effect can be obtained as in the second embodiment described above.

Although the present disclosure has been described in detail with reference to the specific embodiment and modification, it will be apparent to those skilled in the art that the present disclosure is not limited to the above-described embodiment and modification, and various other embodiments are possible within the scope of the present disclosure.

For example, in the above-described embodiments, gyro moments Mjff and Mjr of the left and right front wheels and rear wheel are calculated and a lateral acceleration Gj of the vehicle generated by these gyro moments is calculated. However, the calculation of the gyro moment Mjr of the rear wheel is omitted, and a lateral acceleration Gj of the vehicle generated by the gyro moments may be calculated based on the gyro moments Mjff of the left and right front wheels.

Further, in the above-described embodiments, in step 50, the angular velocities ωfl, ωfr and ωr of the left front wheel, the right front wheel and the rear wheel are low-pass filtered at the first cutoff frequency Fc1. However, the gyro moments Mjff and Mjr of the two front wheels and the rear wheel may be low pass filtered, or a lateral acceleration Gj of the vehicle generated by the gyro moments Mjff and Mjr may be low pass filtered. Also in these low-pass filter processes, the first cutoff frequency Fc1 may be lower than the second cutoff frequency Fc2.

Further, in the above-described embodiments, the actuator 38 is supported so as to be swingable about a pair of pivot shafts 48 by supporting the pivot shafts 48 provided at the center portion in the longitudinal direction thereof by the pair of brackets 46. The output rotary shaft of the actuator 38 protrudes rearward and the boss portion 36B of the swing member 36 is integrally attached to the tip of the output rotary shaft, that is the rear end of the actuator 38, and the suspension spring 50 and the shock absorber are connected to the front end of the actuator 38 and the vehicle body 24 below the front end.

Figure 20:
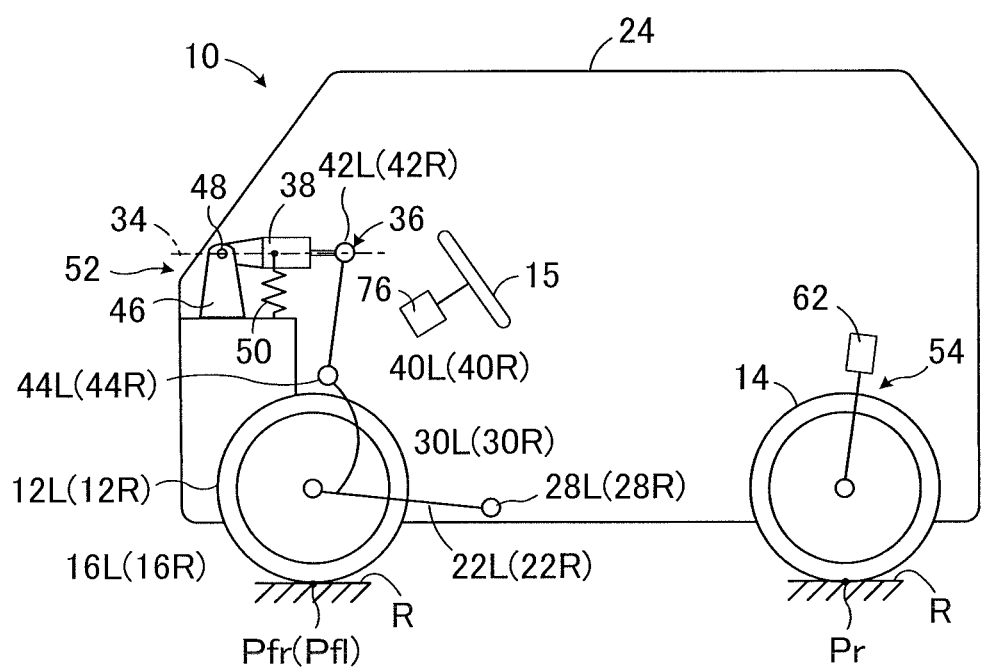
FIG. 20 is a schematic lateral vertical cross-sectional view showing a modified example of the automatic tilting vehicle cut along the center vertical cut plane in the front-rear direction.

However, as shown in FIG. 20, the pivot shafts 48 may be provided at the front end of the actuator 38, the suspension spring 50 and the shock absorber may be interposed between the actuator 38 and the vehicle body 24 on the rear side with respect to the pivot shafts 48 (a first modified embodiment). In that case, since a weight of the vehicle body 24 is supported by a spring force due to an elongation deformation of the suspension spring 50, the suspension spring may be an elastic member such as a tension coil spring, for example. When the rear portion of the actuator 38 is moved downward with respect to the vehicle body 24 due to the gyro moments acting on the front wheels, a height of the vehicle body 24 is reduced due to a reduction in an amount of extension deformation of the suspension spring 50.

Further, the positional relationship of the swing member 36, the suspension spring 50, and the shock absorber in the longitudinal direction with respect to the pivot shafts 48 of the actuator 38 may be opposite to the relationship in the above embodiment. That is, the actuator 38 may be disposed behind the vehicle tilting device 18, the boss portion 36B of the swing member 36 may be integrally attached to the output rotary shaft that projects forward, and the suspension spring 50 and the shock absorber may be interposed between the rear end of the actuator 38 and the vehicle body 24. Furthermore, the positional relationship of the swing member 36, the suspension spring 50 and the shock absorber in the longitudinal direction with respect to the pivot shafts 48 of the actuator 38 may be opposite to the relationship in the above-described first modified embodiment.

Further, the actuator 38 may be supported by the vehicle body so as to move up and down with respect to the vehicle body 24 without oscillating (a second modified embodiment). In that case, a suspension spring 50 such as a compression coil spring may be interposed between the actuator 38 and the vehicle body member above the actuator, or a suspension spring 50 such as a tension coil spring may be interposed between the actuator 38 and the vehicle body member below the actuator.

Further, in the above-described embodiments, the effective lengths of the tie rods 40L and 40R, that is, the distances between the pivot points Par and Pal and the pivot points Pbr and Pbl respectively are smaller than the distances between the pivot points Pbr and Pbl and the grounding points Pfr and Pfl, respectively. However, the effective lengths of the tie rods 40L and 40R may be greater than the distances between the pivot points Pbr and Pbl and the grounding points Pfr and Pfl, respectively. The relationships between the effective lengths of the tie rods 40L and 40R and the distances between the pivot points Pbr and Pbl and the grounding points Pfr and Pfl with respect to the effective lengths of the arm portions 36AL and 36AR may be different from the illustrated relationships.

Further, in the above-described embodiments, the arm portions 36AL and 36AR of the swing member 36 are formed in a straight line without being inclined to each other and extend horizontally when the vehicle 10 is in the standard state. However, the arm portions 36AL and 36AR may be V-shaped so that their heights increase as the distances from the boss portion 36B increase or conversely, may have an inverted V shape so that the height decreases as the distances from the boss portion 36B increase.

Further, in the above-described embodiments, the lower ends of the tie rods 40L, 40R are connected to the knuckles 16L, 16R via the knuckle arms 30L, 30R and the suspension arms 22L, 22R, respectively. However, the knuckle arms 30L, 30R may be integrally connected at the lower ends to the knuckles 16L, 16R, respectively. Furthermore, the knuckle arms 30L, 30R may be omitted, and the tie rods 40L, 40R may be pivotally attached or integrally connected at the lower ends to the knuckles 16L, 16R, respectively.

Further, in the above-described embodiments, although there is only one rear wheel, two rear wheels having a smaller tread than the left and right front wheels may be provided, and the rear wheel may also be drive wheels.

What is claimed is:

1. An automatic tilting vehicle comprising:
a pair of laterally spaced front wheels,
at least one steerable rear wheel,
a vehicle tilting device,
and a control unit;
the pair of front wheels are rotatably supported by corresponding knuckles;
the vehicle tilting device includes a swing member swinging about a swing axis extending in the longitudinal direction of the vehicle, a tilt actuator for swinging the swing member about the swing axis, and a pair of tie rods that are pivotally attached to the swing member at upper end pivotal attachment portions on both lateral sides of the swing axis and pivotally attached to corresponding knuckles at lower end pivotal attachment portions;
the tilt actuator is connected to a vehicle body via a suspension spring;
the control unit is configured to calculate a target tilt angle of the vehicle for tilting the vehicle to the inner side of a turn and to control the tilt actuator so that a tilt angle of the vehicle conforms to the target tilt angle, wherein
the control unit is configured to calculate a target lateral acceleration of the vehicle based on an amount of steering operation of a driver and a vehicle speed, to calculate gyro moments at least of the pair of front wheels based on wheel speeds and a yaw rate of the vehicle, to estimate a lateral acceleration of the vehicle caused by the gyro moments, and to calculate the target tilt angle of the vehicle based on a sum of the target lateral acceleration and the lateral acceleration caused by the gyro moments.

2. The automatic tilting vehicle according to claim 1, wherein the control unit is configured to calculate the gyro moments based on at least wheel speeds of the pair of front wheels, the yaw rate of the vehicle, and the tilt angle of the vehicle.

3. The automatic tilting vehicle according to claim 2, further comprising a setting device that is configured to be operated by at least one occupant, which includes the driver, to set whether to limit the target tilt angle of the vehicle to a predetermined allowable maximum tilt angle or less and the control unit is configured to limit the target tilt angle to the allowable maximum tilt angle when a magnitude of the target tilt angle exceeds the allowable maximum tilt angle in a situation where the setting device limits the magnitude of the target tilt angle.

4. The automatic tilting vehicle according to claim 3, wherein the control unit is configured to perform low pass filter processing on any one of the wheel speeds, the gyro moments, and the lateral acceleration of the vehicle caused by the gyro moments in a situation where the setting device sets to limit the magnitude of the target tilt angle.

5. The automatic tilting vehicle according to claim 4, wherein the control unit is configured to perform low pass filter processing on any one of the wheel speeds, the gyro moments, and the lateral acceleration of the vehicle caused by the gyro moments even in a situation where the setting device does not set to limit the magnitude of the target tilt angle, and a cutoff frequency of the low-pass filter process in the situation where the setting device sets to limit the magnitude of the target tilt angle is set to a value lower than the cutoff frequency of the low pass filter process in the situation where the setting device does not set to limit the magnitude of the target tilt angle.

6. The automatic tilting vehicle according to claim 1, further comprising a setting device that is configured to be operated by at least one occupant, which includes the driver, to set whether to limit the target tilt angle of the vehicle to a predetermined allowable maximum tilt angle or less and the control unit is configured to limit the target tilt angle to the allowable maximum tilt angle when a magnitude of the target tilt angle exceeds the allowable maximum tilt angle in a situation where the setting device limits the magnitude of the target tilt angle.

7. The automatic tilting vehicle according to claim 6, wherein the control unit is configured to perform low pass filter processing on any one of the wheel speeds, the gyro moments, and the lateral acceleration of the vehicle caused by the gyro moments in a situation where the setting device sets to limit the magnitude of the target tilt angle.

8. The automatic tilting vehicle according to claim 7, wherein the control unit is configured to perform low pass filter processing on any one of the wheel speeds, the gyro moments, and the lateral acceleration of the vehicle caused by the gyro moments even in a situation where the setting device does not set to limit the magnitude of the target tilt angle, and a cutoff frequency of the low-pass filter process in the situation where the setting device sets to limit the magnitude of the target tilt angle is set to a value lower than the cutoff frequency of the low pass filter process in the situation where the setting device does not set to limit the magnitude of the target tilt angle.

* * * * *